(12) United States Patent
Pigeon

(10) Patent No.: US 10,035,030 B2
(45) Date of Patent: Jul. 31, 2018

(54) WATER COLLECTING PALLET RACK AND METHOD OF FIRE PROTECTION

(71) Applicant: Firebird Sprinkler Company LLC, Ann Arbor, MI (US)

(72) Inventor: Jeffrey J. Pigeon, Ann Arbor, MI (US)

(73) Assignee: Firebird Sprinkler Company LLC, Ann Arbor, MI (US)

( * ) Notice: Subject to any disclaimer, the term of this patent is extended or adjusted under 35 U.S.C. 154(b) by 0 days.

(21) Appl. No.: 15/447,621

(22) Filed: Mar. 2, 2017

(65) Prior Publication Data

US 2017/0252592 A1 Sep. 7, 2017

Related U.S. Application Data

(60) Provisional application No. 62/303,857, filed on Mar. 4, 2016.

(51) Int. Cl.
*A62C 35/00* (2006.01)
*A47B 43/00* (2006.01)
(Continued)

(52) U.S. Cl.
CPC .......... *A62C 3/002* (2013.01); *A47B 47/0083* (2013.01); *A47B 47/021* (2013.01);
(Continued)

(58) Field of Classification Search
CPC .......... A62C 3/002; A62C 3/00; A62C 35/68; A62C 35/00; B05B 1/26; B65G 1/02;
(Continued)

(56) References Cited

U.S. PATENT DOCUMENTS

| 146,515 A | 1/1874 | Cushman |
| RE16,234 E * | 12/1925 | Taylor ....................... A47F 5/12 |
| | | 211/153 |

(Continued)

FOREIGN PATENT DOCUMENTS

| EP | 0149973 A2 | 7/1985 |
| GB | 1476774 A | 6/1977 |
| JP | 2001158513 A | 6/2001 |

*Primary Examiner* — Jennifer E. Novosad
(74) *Attorney, Agent, or Firm* — Endurance Law Group PLC

(57) ABSTRACT

An open framework warehouse storage rack system for supporting articles on multi-tiered shelves within the wetting zone of an overhead fire sprinkler system. The storage rack system comprises one or more a longitudinally extending rack arrays. A falling water collection system is combined with some or all of the rack arrays. The falling water collection system includes any one of several water handling features that enhance the wetting of storage articles during a fire. One such feature is a scoop-like longitudinal water catcher that protrudes outwardly beyond the front and/or rear faces of the rack array. Another is a transverse intra-stanchion water diverter. Another is a transverse mid-span water diverter. Another is a gutter formed integrally in an uppermost beam. And another is a vertical flue catcher. The falling water collection system maximizes the amount of water that is applied directly to a fire inside the rack array.

20 Claims, 19 Drawing Sheets

(51) Int. Cl.
  *A47B 47/00* (2006.01)
  *A47B 57/00* (2006.01)
  *A62C 3/00* (2006.01)
  *B65G 1/02* (2006.01)
  *A47B 55/00* (2006.01)
  *B05B 1/26* (2006.01)
  *A47B 81/00* (2006.01)
  *A47B 47/02* (2006.01)
  *A47B 97/00* (2006.01)

(52) U.S. Cl.
  CPC .............. *A47B 55/00* (2013.01); *A47B 81/00* (2013.01); *A47B 97/00* (2013.01); *B05B 1/26* (2013.01); *B65G 1/02* (2013.01); *B65G 2207/22* (2013.01)

(58) Field of Classification Search
  CPC ......... A47B 81/00; A47B 97/00; A47B 47/02; A47B 47/021; A47B 47/024; A47B 47/027; A47B 47/0083; A47B 55/00; A47B 87/005
  USPC ............... 211/153, 183, 191, 192; 52/11–16; 169/16, 10
  See application file for complete search history.

(56) References Cited

U.S. PATENT DOCUMENTS

| | | | | |
|---|---|---|---|---|
| 2,322,748 A * | 6/1943 | Shaw | A47B 87/0207 | 108/53.5 |
| 2,809,074 A * | 10/1957 | McDonald | A62C 3/00 | 169/16 |
| 3,349,924 A * | 10/1967 | Maurer | A47F 7/0014 | 211/189 |
| 3,520,345 A | 7/1970 | Lillibridge et al. | | |
| 3,539,108 A * | 11/1970 | Lillibridge | A62C 3/002 | 169/16 |
| 3,664,513 A * | 5/1972 | Atwater | B65G 1/02 | 211/134 |
| 3,702,636 A * | 11/1972 | Hart | A62C 3/004 | 169/16 |
| 3,720,268 A * | 3/1973 | Seiz | A47B 57/487 | 169/16 |
| 3,727,694 A * | 4/1973 | Dudzik | A62C 35/605 | 169/16 |
| 3,732,930 A * | 5/1973 | D'Anneo | A62C 37/10 | 169/54 |
| 3,802,574 A * | 4/1974 | Weider | A47B 7/027 | 108/187 |
| 4,006,559 A * | 2/1977 | Carlyon, Jr. | A01G 9/023 | 137/575 |
| 4,178,994 A * | 12/1979 | Ito | A62C 3/002 | 169/16 |
| 4,319,689 A * | 3/1982 | Clapp | B65G 1/02 | 211/134 |
| 4,418,757 A * | 12/1983 | Merkel | A62C 35/58 | 169/54 |
| 4,473,973 A * | 10/1984 | Lane | E04D 13/064 | 52/13 |
| 4,708,252 A * | 11/1987 | Azzi | A47B 57/04 | 108/108 |
| 5,012,934 A * | 5/1991 | Newhall | A47J 47/16 | 211/41.3 |
| 5,094,350 A * | 3/1992 | Smock | A47B 57/04 | 211/150 |
| 5,115,920 A * | 5/1992 | Tipton | B65G 1/023 | 211/151 |
| 5,199,582 A * | 4/1993 | Halstrick | A47B 96/021 | 169/10 |
| 5,368,174 A | 11/1994 | Clark et al. | | |
| 5,386,917 A * | 2/1995 | Clark | A47B 96/00 | 169/5 |
| 5,492,231 A | 2/1996 | Clark | | |
| 5,505,141 A * | 4/1996 | Barber | B65D 19/0038 | 108/56.1 |
| 5,526,945 A | 6/1996 | Clark et al. | | |
| 5,577,622 A * | 11/1996 | Kapteyn | A47F 5/0025 | 211/133.1 |
| 5,628,540 A * | 5/1997 | James | B60R 9/00 | 211/189 |
| 5,636,755 A * | 6/1997 | Guiher | A47B 96/00 | 169/16 |
| 5,655,675 A | 8/1997 | Clark et al. | | |
| 5,749,482 A | 5/1998 | Clark | | |
| 6,173,846 B1 * | 1/2001 | Anderson | A47B 47/027 | 211/183 |
| 6,260,719 B1 * | 7/2001 | Azzopardi | B65G 1/02 | 211/189 |
| 6,378,711 B1 * | 4/2002 | Skulnik | A47B 96/1441 | 211/183 |
| 6,450,350 B1 * | 9/2002 | Krummell, Jr. | A47B 47/027 | 211/183 |
| 7,055,704 B2 * | 6/2006 | Alter | A47B 47/028 | 108/51.11 |
| 7,891,507 B2 * | 2/2011 | Shetler | A47B 55/00 | 211/135 |
| 8,443,992 B2 * | 5/2013 | Lawson | A47B 47/028 | 211/187 |
| 9,375,102 B2 * | 6/2016 | Troyner | A47B 47/021 | |
| 9,604,783 B2 * | 3/2017 | McAuliffe | B65G 1/14 | |
| 9,675,827 B2 * | 6/2017 | Pigeon | A62C 35/68 | |
| 2006/0091087 A1 * | 5/2006 | Belanger | A47B 61/04 | 211/37 |
| 2006/0236900 A1 | 10/2006 | Brochu | | |
| 2006/0249058 A1 * | 11/2006 | Moore, Jr. | B65D 19/0026 | 108/57.25 |
| 2008/0237163 A1 * | 10/2008 | Smith | A47B 96/00 | 211/105.5 |
| 2009/0084746 A1 * | 4/2009 | Rioux | A47B 47/021 | 211/183 |
| 2011/0017476 A1 * | 1/2011 | Fuchs | A62C 3/002 | 169/11 |
| 2013/0105428 A1 * | 5/2013 | Yaniak | A47B 55/00 | 211/168 |
| 2015/0014262 A1 * | 1/2015 | McAuliffe | B65G 1/14 | 211/71.01 |
| 2015/0027739 A1 | 1/2015 | Multer et al. | | |
| 2016/0369941 A1 * | 12/2016 | Consaul | F16M 13/02 | |
| 2017/0252592 A1 * | 9/2017 | Pigeon | A62C 3/002 | |

\* cited by examiner

WATER COLLECTING PALLET RACK AND METHOD OF FIRE PROTECTION

CROSS REFERENCE TO RELATED APPLICATIONS

This application claims priority to Provisional Patent Application No. 62/303,857 filed Mar. 4, 2016, the entire disclosure of which is hereby incorporated by reference and relied upon.

BACKGROUND OF THE INVENTION

Field of the Invention

The invention relates generally to systems and methods for extinguishing fires, and more particularly to a pallet rack storage system specially configured to suppress in-rack fires.

Description of Related Art

Articles stored in warehouses usually represent a significant capital investment in either raw, partially finished or finished good/inventory. In a warehouse, articles—sometimes palletized—are frequently stacked in multi-tiered rack arrays, which in turn are arranged in long rows. An unchecked fire can quickly destroy these valuable articles either by direct combustion, or collaterally be heat, smoke or water damage. Furthermore, articles stacked in rack arrays usually offer an abundant fuel source for a fire to grow and quickly propagate, making warehouse fires especially difficult to extinguish. It is therefore of great economic importance to rapidly contain fires in warehouses.

Fire containment is largely dependent on the rapid delivery of large quantities of water to the locus of the fire. That is to say, early stage fire containment in a warehouse storage setting is maximized when a lot of water is moved to the fire source as quickly as possible.

This objective is often frustrated in warehouse storage settings due to the fact that stacked or arranged rows of articles tend to make it difficult for water sprayed from an overhead fire sprinkler system to reach a fire starting deep inside a rack array near the floor. When articles are stacked or arranged in rows, narrow gaps between adjacent articles are formed. These narrow gaps are often called flues. There are transverse flues and, in cases, longitudinal flues. Transverse flues are formed in the gaps between adjacent articles in the same rack array, whereas longitudinal flues are created in the gap between two adjacent rack arrays arranged back-to-back. When a fire originates in or near the longitudinal flue, it is very difficult to reach the fire with water dispersed from an overhead fire sprinkler. The fire produces hot combustion gases that travel upwardly through the narrow flues like chimneys. When the escaping heat is sufficient to activate at least one nearby overhead fire sprinkler, water (or other fire suppressing liquid) will be discharged into the region. In order to be effective, the water must travel down the very same flues that the heat from the fire is rising through. The rising heat, concentrated within the narrow passageways of the flues will tend to vaporize the descending water spray unless sufficient quantities/densities of water can be applied to overpower the heat. The greatest success at fire suppression will be achieved when, at the initial stages of a fire, a maximum amount of water is applied to the flues nearest to the burning objects.

Furthermore, a surprisingly large percentage of water issuing from overhead sprinklers lands uselessly on the floor rather being usefully applied to combat a fire or wet surrounding objects in jeopardy. For water discharged from an overhead sprinkler, the initial point of water contact is, most commonly, over the uppermost surfaces of storage articles located on the highest elevation shelves located within the spinkler's reach, or wetting zone. Run-off water flows to the outer edges of these highly elevated storage articles and then cascades over the sides. A majority of the run-off water is expected to fall uselessly to the floor. Some small portion of the water is expected to migrate into the interior regions of the rack arrays, but is quickly evaporated by heat rising from the fire. As a result, in prior art fire suppression systems, a near-ground fire typically grows rapidly inside a rack array with little to no direct exposure to the sprayed water until the fire has grown large and powerful and set ablaze many levels of articles.

Understanding this problem, the prior art has taught to locate fire suppressing sprinkler systems inside of rack arrays, especially in the longitudinal flue area of rack arrays arranged back-to-back. In-rack sprinkler systems are notoriously expensive to install, and are prone to frequent damage from collisions as articles are frequently moved into and out of the rack arrays during normal warehousing activities. Furthermore, an in-rack system is usually installed in conjunction with a standard overhead fire sprinkler system, more than doubling the cost of a complete fire suppression system in a warehouse. And yet another drawback of in-rack systems is the constraint imposed on future remodeling efforts. That is to say, once an in-rack sprinkler systems is installed, a warehouse manager will be reluctant to rearrange the location of the affected rack arrays due to the integrated plumbing. Thus, in-rack sprinkler systems are not an attractive solution, but compared to the catastrophic prospect of fire in a warehouse are used with some frequency.

Another problem with in-rack sprinkler systems pertains to the distribution of water inside rack arrays. In particular, water forcefully discharged from a sprinkler head located deep inside (e.g., in a longitudinal flue) of a rack array will tend to explosively splash and ricochet, without much opportunity for thoughtful guided placement of water. Moreover, to protect the sprinkler heads from collision damage, it is common practice to intentionally shelter the plumbing and spray heads between the rack's structural horizontal beams. This sheltering of the spray heads severely compromised the spray pattern. Evidence of this concern can be seen, for example, in U.S. Pat. No. 5,636,755 issued Jun. 10, 1997. Here, the sprinkler heads are sheltered between specially shaped beams designed to channel water into the interior of the rack array. While this concept may have helped better distribute water from the in-rack system, still no benefit is provided to water discharged from overhead sprinklers whose run-off continues to cascades over the sides and fall uselessly to the floor. Furthermore, the requirement of specially shaped beams forecloses any opportunity for a retrofit solution universally adaptable to all major brands of racking systems.

There is a need in the art for an improved storage rack system that is compatible with overhead fire suppression systems and amenable to in-rack systems, and that will maximize rapid delivery of water to the fire-prone interior regions of a rack array.

BRIEF SUMMARY OF THE INVENTION

An open framework warehouse storage rack of the type for supporting articles on multi-tiered shelves within the wetting zone of an overhead fire sprinkler system. The storage rack comprises a longitudinally extending rack array having a front side and a rear side. The rack array has at least two longitudinally spaced-apart stanchion sections. Each the stanchion section is perpendicularly offset from the next adjacent stanchion section. A plurality of horizontal beams interconnect adjacent stanchion sections. The plurality of beams are disposed at different elevations to form multi-tiered article support shelves. The rack array is combined with a falling water collection system. The falling water collection system includes at least one water catcher operatively protruding outwardly beyond one of the front and rear sides for collecting water falling outside of the rack array and channeling the collected water inwardly into the rack array to enhance the wetting of articles supported therein during a fire.

An open framework warehouse storage rack system accessible from opposite sides for supporting articles on multi-tiered shelves within the wetting zone of an overhead fire sprinkler system. The storage rack system comprises: a longitudinally extending first rack array has a front side and a rear side. A longitudinally extending second rack array has a front side and a rear side. The rear side of the second rack array disposed in parallel back-to-back relationship with the rear side of the first rack array. Each rack array has at least two longitudinally spaced-apart stanchion sections perpendicularly offset from one another. A plurality of horizontal beams interconnect the adjacent stanchion sections. The plurality of beams are disposed at a different elevations to form a plurality of horizontal shelves. A falling water collection system is combined with each rack array. The falling water collection system includes at least one water catcher operatively protruding outwardly beyond at least one of the front and rear faces of each rack array for collecting water falling outside of and/or in-between the first and second rack arrays to enhance the wetting of articles during a fire.

The improved storage rack and falling water collection system of this invention takes fullest advantage of water sprayed onto and nearby the storage rack, and intentionally channels that water rapidly toward the fire-prone interior regions of a rack array. Furthermore, the improved storage rack system is compatible with overhead fire suppression systems and is readily adaptable to in-rack systems. The principles of this invention transform the transverse and/or longitudinal flues into firefighting agents, thus making the fire suppression systems more efficient.

The invention also contemplates a method for combating fires in a water collecting warehouse storage rack by collecting water falling on or about the outside of a rack array, and channeling the collected water inwardly into the shelving to wet articles supported therein.

BRIEF DESCRIPTION OF THE SEVERAL VIEWS OF THE DRAWINGS

These and other features and advantages of the present invention will become more readily appreciated when considered in connection with the following detailed description and appended drawings, wherein.

Figure 17:
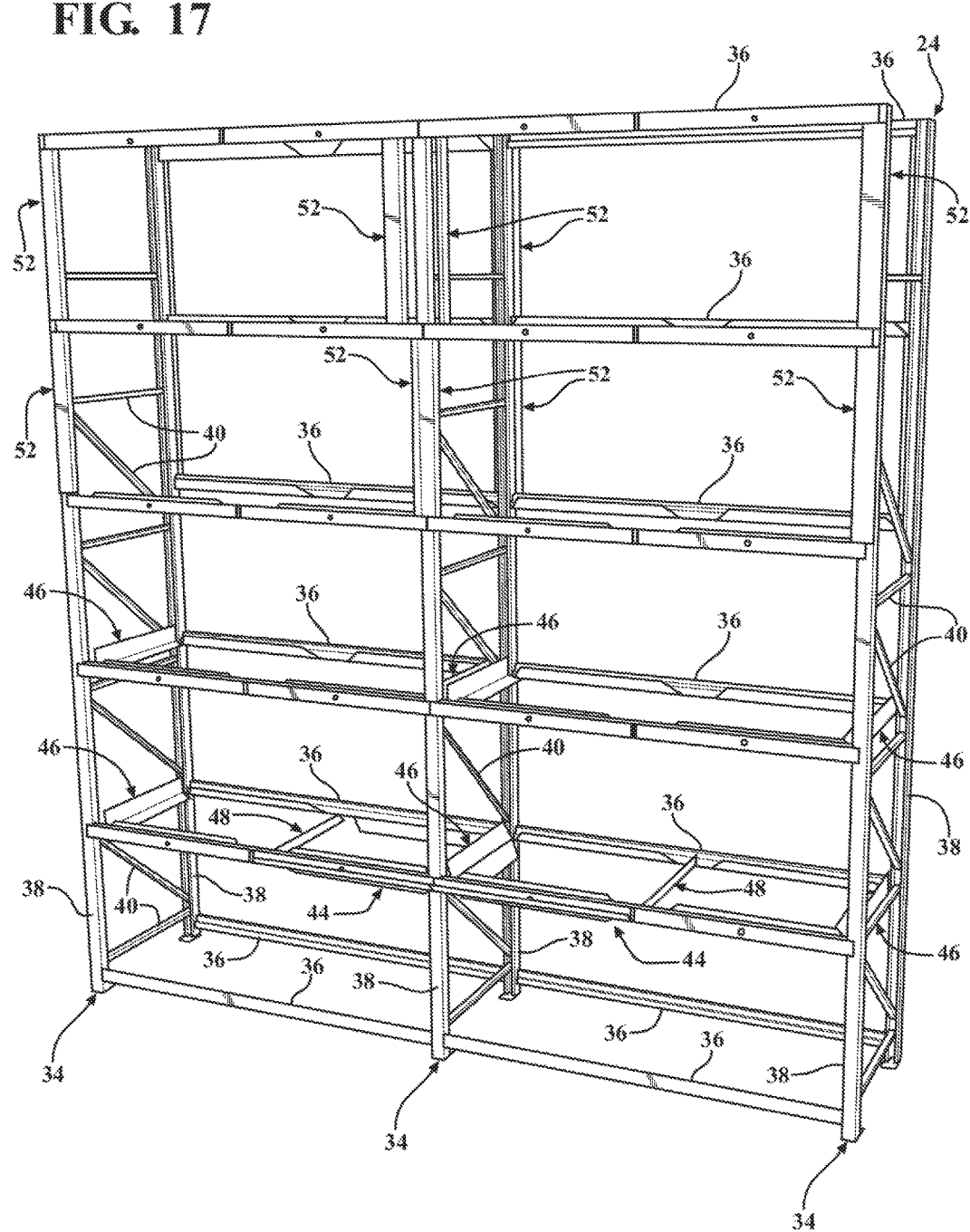
FIG. 17 is a perspective view showing an exemplary rack system fitted with water catchers and also optional primary/ mid-span diverters and also optional vertical flue catchers according to yet another alternative embodiment of the invention.
Figure 18:
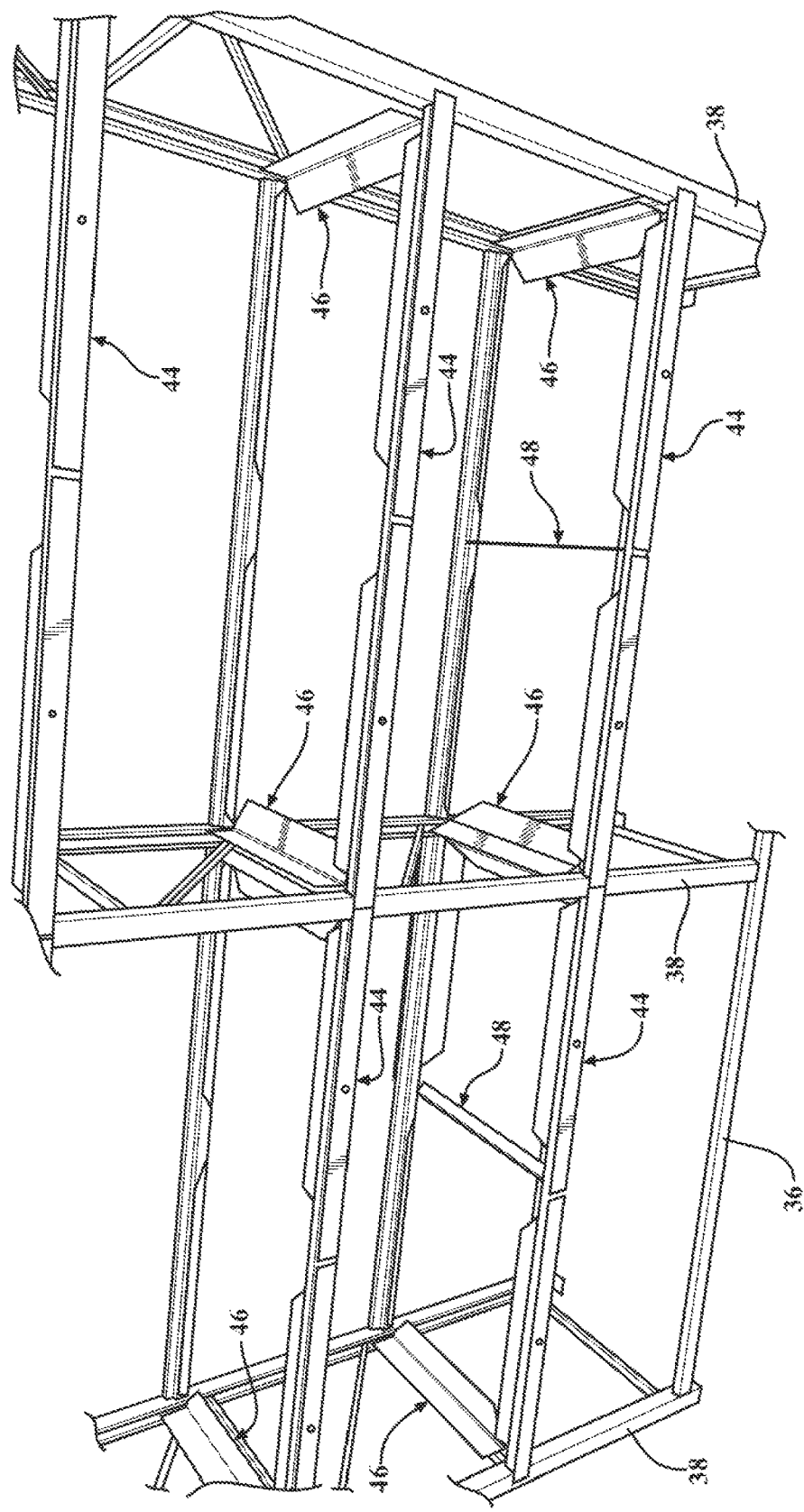
Figure 19:
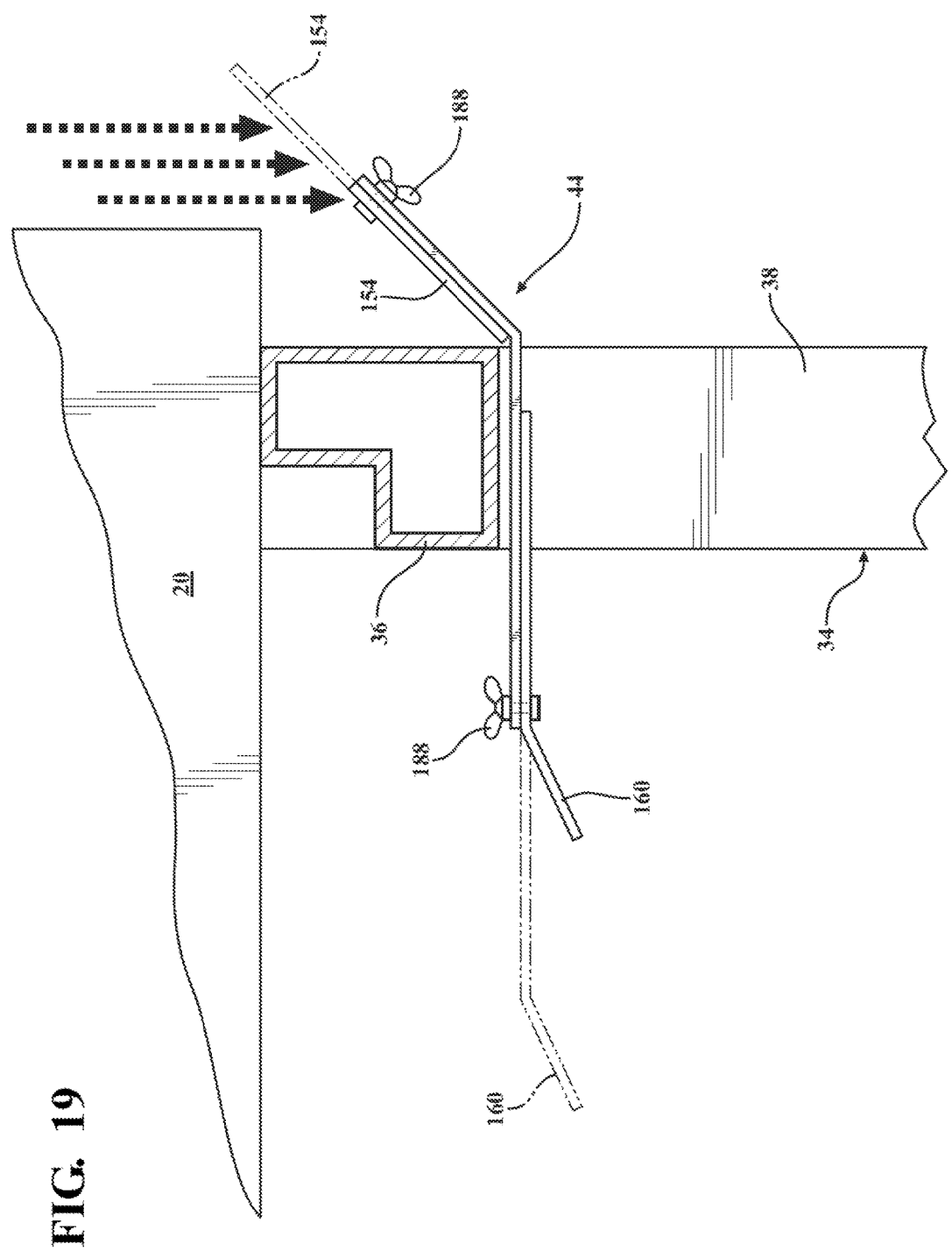

FIG. 18 is a close-up view of the optional primary/mid-span diverters as shown in FIG. 17; and FIG. 19 is simplified cross-sectional view through a beam and water catcher according to a still further alternative embodiment with adjustable extension flap and spout features.

DETAILED DESCRIPTION OF THE INVENTION

Figure 4:
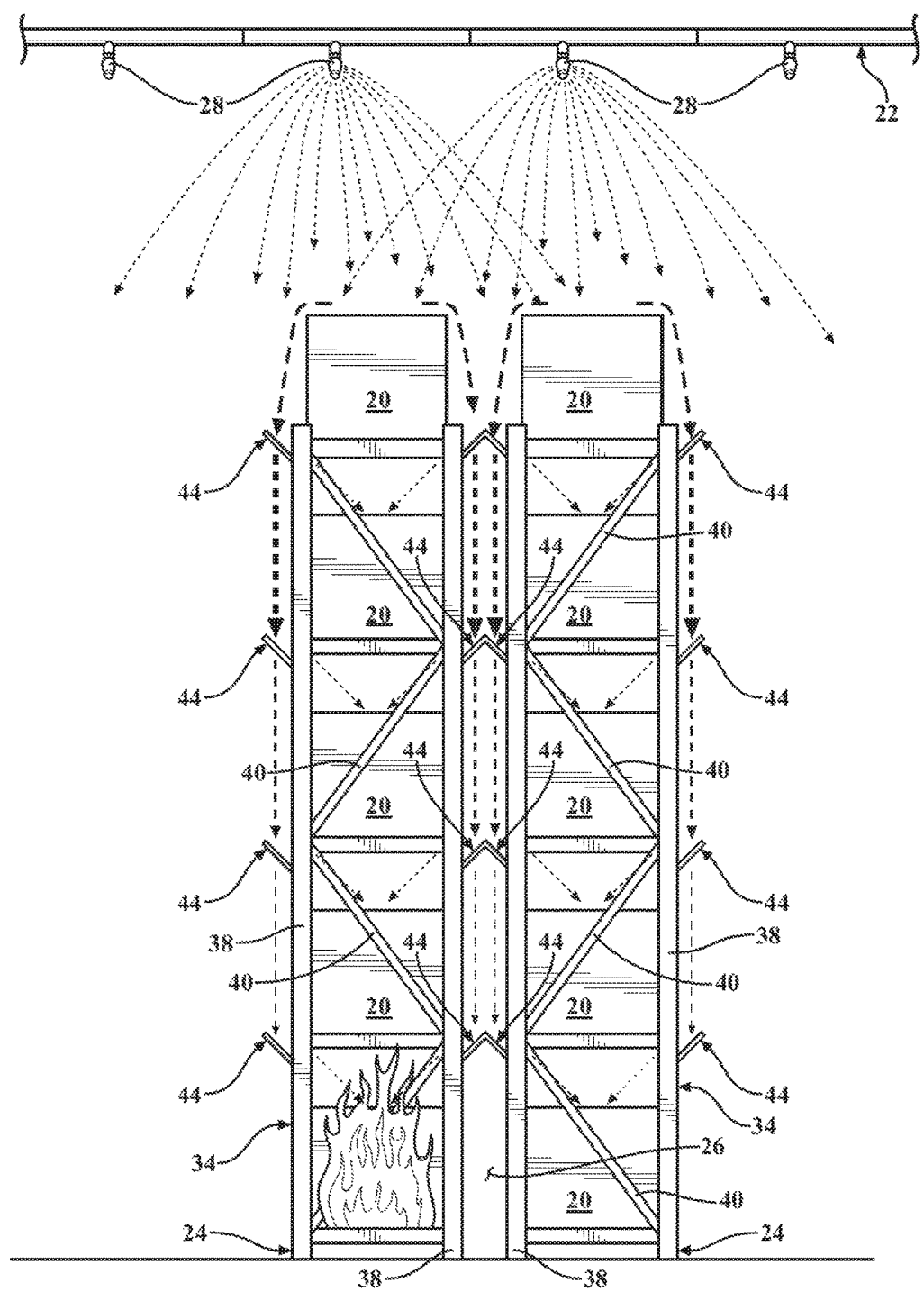
FIG. 4 is a view similar to FIG. 3 but showing a storage rack fitted with a falling water collection system according to one embodiment of the invention, with water catchers capturing significant quantities of the falling run-off water and diverting the captured water inwardly toward the fire.

Referring to the figures, wherein like numerals indicate like or corresponding parts throughout the several views, the invention is set in the context of an open framework type of warehouse storage rack system for supporting articles 20 on multi-tiered shelves within the wetting zone of an overhead fire sprinkler system 22 (e.g., FIG. 4). The storage rack may comprise any of various forms of industrial racking including, but not limited to, pallet racks, cantilever racks, picker racks, conveyor racks and drive-in racks to name a few. For consistency, the following descriptions and accompanying illustrations generally portray the storage rack system as a common pallet-type rack structure, however the invention is intended to be generally applicable to many different types of industrial racking configurations.

Furthermore, the storage rack may exist as a single, stand-alone longitudinally-extending rack array 24 accessible from both sides (e.g., FIG. 17), or as two back-to-back rack arrays 24 (e.g., FIG. 1, common in pallet rack set-ups), or in the form of many rack arrays 24 densely-nested side-by-side like those used in drive-in rack systems (not shown). Indeed, many configuration options are contemplated. The rack array 24 supports multi-tiered shelves upon which are placed the storage articles 20. In a typical warehouse scenario, storage articles 20 are loaded on and off the shelves, often by forklift or automated picker. Sometimes, the storage articles 20 are palletized, i.e., carried on standard-sized wood or metal or plastic pallets, to facilitate handling with the forklift or picker.

Figure 1:
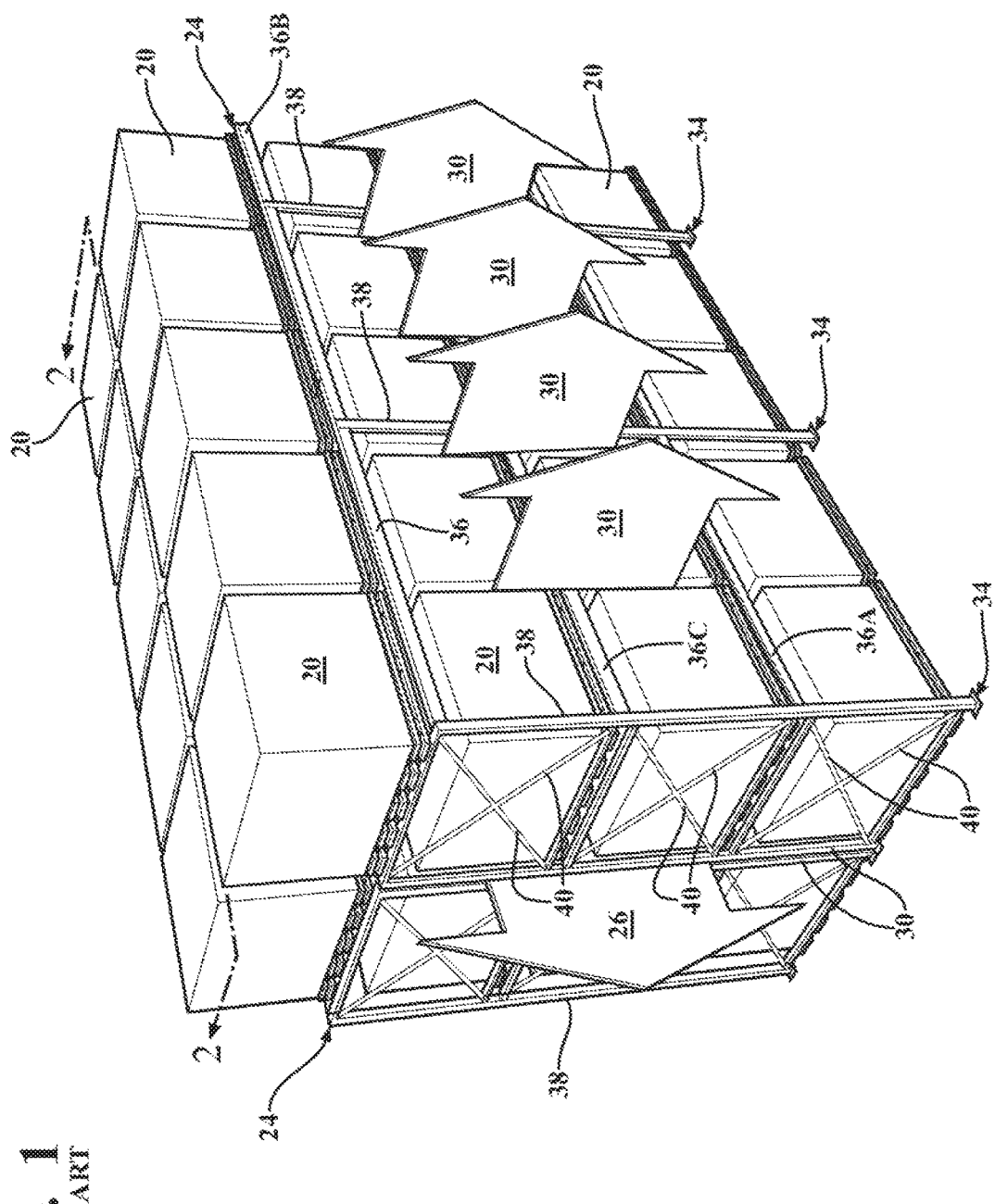
FIG. 1 is a perspective view of exemplary prior art storage racks disposed in pairs arranged back-to-back and each supporting storage articles on shelves, the spaces between storage articles forming air gaps conducive to fire propagation as identified by wide arrows.
Figure 2:
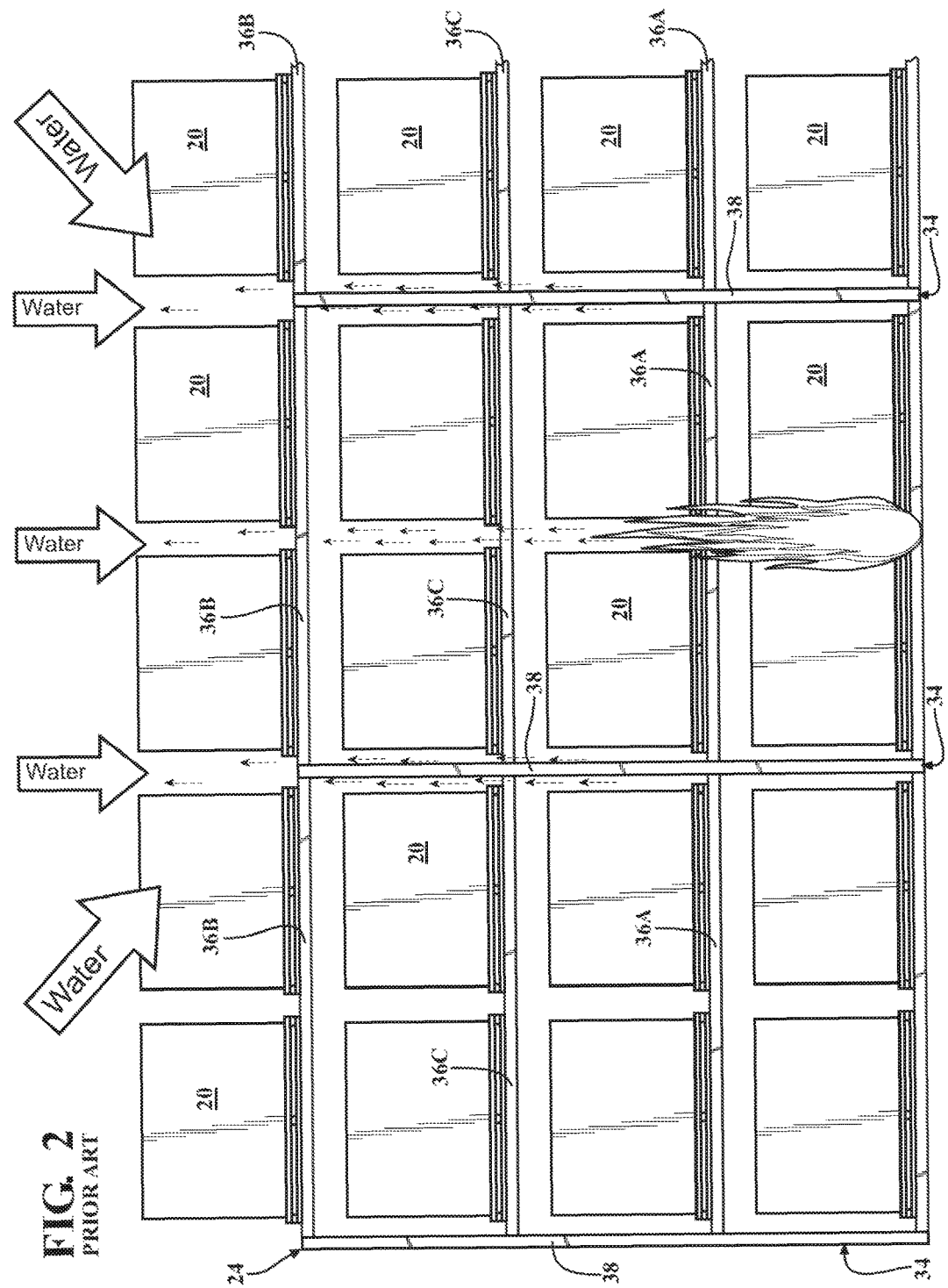
FIG. 2 is a view taken generally along lines 2-2 in FIG. 1 to expose the narrow space between two back-to-back storage racks, and showing the locus of a fire whose hot gases travel upwardly though the air gaps formed in the spaces between storage articles.
Figure 3:
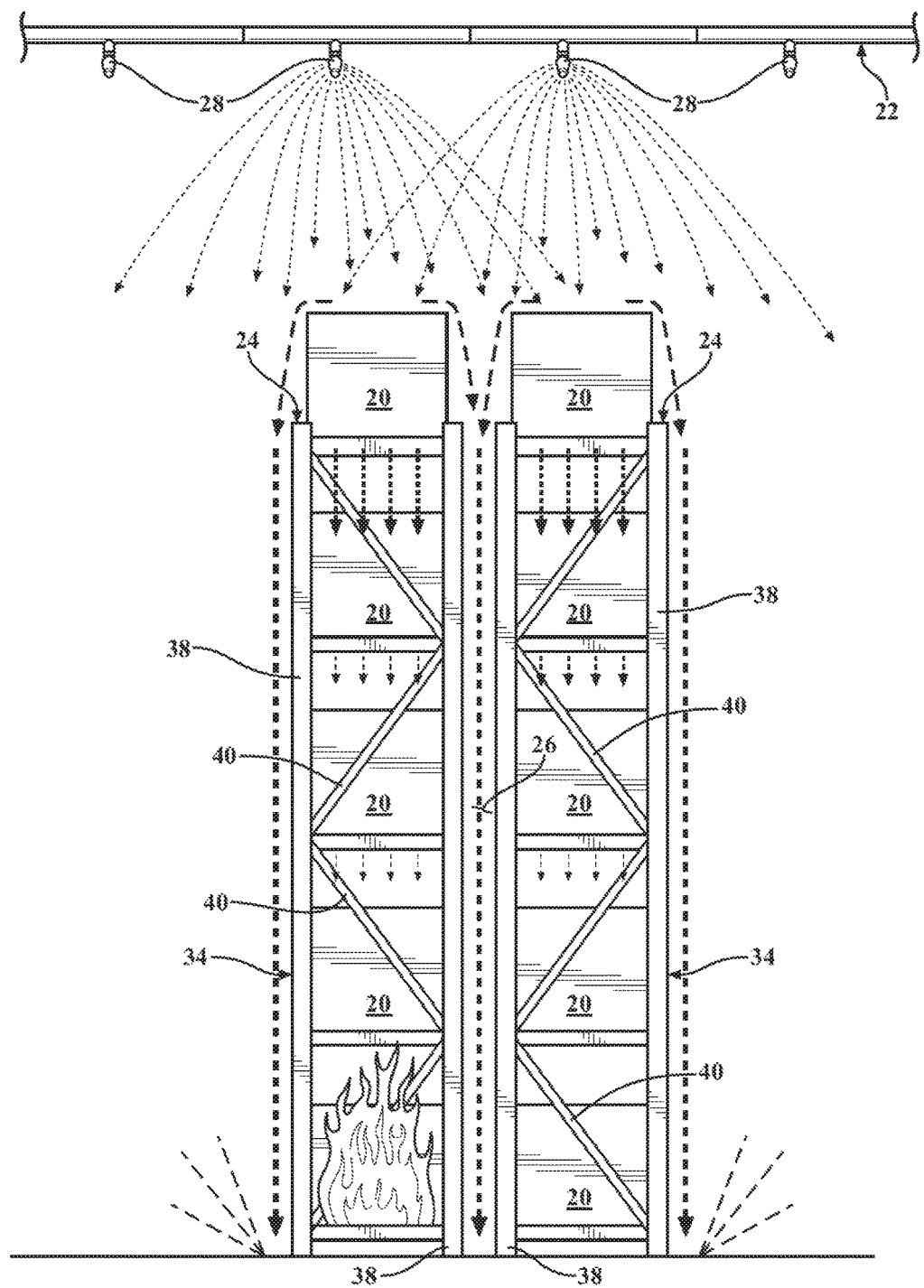
FIG. 3 illustrates, in highly simplified form, a scenario according to prior art constructions where a fire grows inside a storage rack near the floor and water from an overhead sprinkler either evaporates before reaching the fire or falls uselessly to the floor.

Referring specifically, to the example of FIGS. 1-3, the configuration is typical of a general structural storage set-up where two back-to-back rack arrays 24 are arranged so that each rack array 24 has a longitudinally extending outwardly-facing front side that is accessible for loading/unloading articles 20, and a longitudinally extending rear side. The two arrays 20, which for simplicity may be referred to as first and second arrays 24, are thus disposed in parallel back-to-back relationship so that their respective rear sides directly oppose one another. In practice, a space of about 6" to 12" (or more or less) is established between these rear sides by the placement of row spacers (not shown). The row spacers are typically short lengths of rigid metal tubing or angle used to directly connect the first array 24 to the second array 24 and maintain a generally consistent longitudinal separation therebetween. The long, narrow, cavernous space between the rack arrays 24 is known as a longitudinal flue 26.

As briefly mentioned above, a fire suppression system 22 is suspended from above in the warehouse, at an elevation that is greater than the overall height of the storage articles 20 disposed on the uppermost shelves of the rack arrays 24. Distances of ten to forty feet (10'-40') between top of storage racks and the sprinkler heads 28 of the fire suppression system 22 are common. In the event of a fire, the locus of the fire may be somewhere in a rack array 24. The arrangement of rack arrays 24 and the typical placement of storage articles 20 on the various levels of shelves in the rack arrays 24 establish a plurality of transverse flues 30 in addition to the one longitudinal flue 26, as shown in FIG. 1. These flues 26, 30 are indicated by wide directional arrows. The transverse flues 30 are formed in the gaps between adjacent articles 20 stored on the rack arrays 24. To be clear, a longitudinal flue 26 is created in the gap between two adjacent rack arrays 24 when arranged back-to-back. A stand-alone rack array 24 like that in FIG. 17 does not have a longitudinal flue. The importance of these flues 26, 30 becomes relevant when a fire is present in or adjacent one of the storage articles 20, as shown in FIG. 2. Perhaps a worst-case scenario in terms of fire suppression is when a fire originates at or near the floor, because this is the most distant and difficult to reach region for fire suppressing liquid dispersed from an overhead fire sprinkler 28, and because the natural upward propagation of the fire will readily find more fuel in the form of stacked articles 20. Unfortunately, most warehouse fires start at or near the floor. For this reason, sometimes an in-rack sprinkler system 32 is added to work in combination with an overhead system 22, as depicted for example in FIGS. 10-12.

Referring still to FIG. 2, all fires in rack arrays 24 produce hot combustion gases that travel upwardly through the narrow flues 26, 30 like chimneys. When the escaping heat is sufficient to activate at least one nearby overhead fire sprinkler 28, water (or other fire suppressing liquid) will be discharged. In order to be effective, the water must travel down the very same flues 26, 30 through which heat from the fire is rising. The rising heat, concentrated within the narrow passageways of the flues 26, 30, tends to vaporize the descending water spray unless sufficient quantities of water and/or large enough droplet sizes can be applied to overpower the heat. The greatest success at fire suppression will be achieved when, at the initial stages of a fire, a maximum amount of water is applied to the flues 26, 30 directly onto the fire locus.

The rack arrays 24 are typically constructed with standardized components and designed to be scalable as needed for the application. The standardized components include at least two longitudinally spaced-apart vertical stanchion sections 34 and a plurality of horizontal beams 36. It is useful to consider that the basic building block of the rack array 24 is merely two adjacent stanchion sections 34 perpendicularly offset from one another by a plurality of intervening horizontal beams 36. In FIG. 2, three stanchion sections 34 are shown to illustrate the scalable nature of the construct. The several beams 36, usually appearing in pairs, are attached between the stanchion sections 34 at different elevations to form the multi-level shelves upon which articles 20 are stacked for efficient storage.

The stanchion sections 34 can take many different forms. In a cantilever rack configuration, for example, the stanchion section 34 may be merely a single upright column. Or, the stanchion section 34 may be formed as a wide panel like the side of a bookcase. In many cases, however, the stanchion sections 34 will be formed by an open framework composed of a vertically oriented front upright 38 and a vertically oriented rear upright 38. The front and rear uprights 38 are rigidly spaced-apart from one another by a network of cross-braces 40. Cross-bracing 40 joins the two uprights 38 at a standard span of typically about four to five feet to create a transverse array depth. FIG. 1 shows the cross-braces 40 overlapping one another in an "X" configuration, whereas FIG. 4 shows the cross-brazes 40 in a zig-zagging "Z" pattern. Naturally, the use and placement of cross-braces 40 will be dictated by the manufacturer and/or the application. The uprights 38 may be manufactured according to any of the commercially available designs, many of which provide a hollow interior passage extending generally the entire vertical lengths thereof which may be useful in some optional embodiments like those described below in connection with FIG. 16. Quite often, the uprights 38 will have regularly-spaced holes, sometimes tear-drop in shape, extending in closely-spaced intervals along the entire length. Hole spacing is frequently on one-inch or two-inch intervals so that the beams 36 can be connected to set shelf heights at desired elevations.

Still referring to the example of FIGS. 1-3, each stanchion section 34 is perpendicularly offset from the next adjacent stanchion section 34 so that the respective the front uprights 38 are located along the front side of each rack array 24 and the rear uprights 38 are located along the rear side of each rack array 24. The plurality of horizontal beam pairs 36 includes a lowermost beam pair 36A and an uppermost beam pair 36B and at least one intermediate beam pair 36C. Each beam pair comprises a front beam 36 and a horizontally-aligned rear beam 36. It bears repeating that in some contemplated storage rack embodiments there may be only one beam 36 per shelf/elevation and not a pair of beams. However, in the illustrated examples, the beams 36 are arranged in front and rear pairs, with each front beam 36 extending between and directly connecting two adjacent front uprights 38. Likewise, each rear beam 36 extends between and directly connects two adjacent rear uprights 38. The plurality of beam pairs 36 thus rigidly joins each adjacent stanchion section 34 at different elevations to form a plurality of tiered horizontal shelves so that articles 20 can be stacked for storage.

The beams 36 adjoin the two transverse stanchion sections 34 via one of the many coupling arrangements (e.g., bolts or self-locking tabs) to form a sturdy rectilinear structure with shelves formed by or upon each pair of beams 36. In one common arrangement, each beam 36 has end fittings that are designed to cooperate with the pattern of holes in the uprights 38. Typically, the beams 36 are about nine feet long, which establish a shelf width (i.e., an interior spacing between transverse stanchion sections 34) of about nine feet so that two palletized articles 20 will comfortably sit side-by-side on each shelf, as shown in the Figures. Of course, the lengths of the beams 36 can be adapted for the intended application.

In many cases, one or more decking members 42 (FIG. 11) will extend like bridges between the beam pairs 36 to fortify support for the articles 20. The decking member(s) 42 can take many different forms, including but not limited to planks or sheets of wood or wire grids.

FIGS. 1-3 are identified as prior art constructions, in that they are not fitted with supplement fire suppression technology as will be described further below. As a result, these storage rack constructions are useful to illustrate a common scenario where a fire grows inside a rack array 24 near the floor. Referring specifically to the schematic end-view of FIG. 3, heat from the fire is shown having activated two overhead fire sprinklers 28. In large warehouses, there may be considerably more distance between the tops of the highest articles 20 and the sprinkler heads 28. In any event, water from the sprinklers 28 is dispersed over a wetting zone, which is the range or reach of water discharged from the sprinklers 28 at the design water pressure/flow rate. The two rack arrays 24 visible in this view are within the wetting zone, and are thus exposed to falling water at a specified rate. The initial point of water contact is, most commonly, over the uppermost surfaces of storage articles 20 located on the highest elevation shelves in the two back-to-back rack arrays 24. Standard overhead sprinklers 28 disperse water over a generally circular area, although some examples are known to generate a non-circular wetting area. Run-off water flows to the outer edges of storage articles 20 and can be expected to drain in sheets like a water-fall across the front (outside) and rear (inside) faces of each rack array 24 and also down the transverse flues 30. This is sometimes referred to as the curtain effect. A majority of the run-off water lands on the floor, where it does not directly fight the fire. A portion of the water will naturally migrate into the interior regions of the rack arrays but, as shown by the shrinking arrows, is progressively diminished in volume by each layer of shelved articles 20. To compound the problem, heat from the fire will be rapidly growing, which has the effect of evaporating what little water makes its way beyond the two or three uppermost shelves. As a result, in prior art systems a near-ground fire typically grows rapidly inside a rack array 24 with little to no direct exposure to the sprayed water until the fire has grown large and powerful and set ablaze many levels of articles 20.

This present invention is uniquely designed to combat fires in warehouse settings where storage articles 20 are tightly stacked or arranged on one or more rack arrays 24. Rack arrays 24 fitted with novel fire suppression features of this invention are shown in FIG. 4 and following. The present invention is particularly aimed at capturing run-off water that would otherwise be wasted dousing the floor, and diverting that run-off water into the general vicinity of the fire. The old maxim "a stitch in time saves nine" has application to the field fire suppression. To wit, a given quantity water applied directly to a fire at its initial stages, i.e., while the fire is still relatively small, will have a greater impact on fire suppression than the same quantity of water applied to a much larger fire. That is to say, the aim of this invention is to rapidly divert and distribute as much water as possible to the interior regions of a rack array 24 where a fire is most likely to occur. In so doing, the chances of squelching a nascent fire are substantially higher, thereby reducing the amount of collateral damages to nearby articles 20 and property.

The novel fire suppression concepts of this invention utilize a falling water collection system to capture run-off water that would otherwise fall uselessly to the floor, and distribute that collected water into the shelves where a fire is likely to occur. The falling water collection system is composed of any one or more of the following sub-systems: one or more longitudinal water catchers 44, one or more one transverse intra-stanchion water diverters 46, one or one transverse mid-span water diverters 48, one or more gutters 50, and one or more vertical flue catchers 52. The primary objective of these novel fire suppression features 44-52 is to maximize the amount of water that is applied directly to a fire inside the rack array 24. Each of these falling water collection system features 44-52 will be described separately, beginning with the longitudinal water catchers 44.

As portrayed in FIG. 4, the one or more (preferably many) water catchers 44 operatively protrude outwardly beyond the longitudinal front and/or rear sides of the rack array 24 for collecting falling water and channeling the collected water inwardly into the rack array 24 to enhance the wetting of articles 20 supported therein during a fire. Optimally, the water catchers 44 are operatively associated with the beams 36, being located so at to fasten directly to or immediately below each beam 36 and then protrude rather significantly outwardly from the face of the beams 36. In the embodiment illustrated in FIG. 3, one water catcher 44 is operatively associated with each of the front and rear beams 36. Consequently, water that is both free-falling like rain and also water running down the faces of the beams 36 will be captured by the water catchers 44 and diverted inwardly to combat storage fires.

At a minimum, it is desirable to attach longitudinal water catchers 44 either directly to, or directly adjacent to, the beams 36 along the lower regions of the rack arrays 24. This is in consideration to the belief that longitudinal water catchers 44 located closest to ground level will have the greatest impact fighting fires, whereas longitudinal water catchers 44 located close to the top of the rack array 24 will have a lesser impact if one accepts that most storage rack fires begin at or near floor level. Furthermore, any fire that starts above the third (or fourth) shelving level is already very close to the water spray from the overhead sprinklers 28, and will be suppressed in due course in the conventional manner. Therefore, it is contemplated that the longitudinal water catchers 44 will be affixed at least above the first one or two or three levels of shelves in a storage rack system 20. Placing longitudinal water catchers 44 at shelving levels above the third (or perhaps even fourth level and above) shelving level is certainly an option, as shown in FIG. 4.

FIG. 4 is a view similar to FIG. 3 in that a fire is shown at its initial stages beginning to grow inside a rack array 24 near the floor. Heat from the fire has activated two overhead fire sprinklers 28. Water from the sprinklers 28 is dispersed over the rack array 24 and runs over the outer edges of the storage articles 20 located on the highest elevation shelves in the rack arrays 24. Run-off water (represented by dashed arrows) drains in sheets like water-falls across the outside faces of each rack array 24 and also down the flues 26, 30. (Only the longitudinal flue 26 is visible in FIG. 4.) Longitudinal water catchers 44 project from the rack arrays 24 like scoops, capturing significant portions of the falling run-off water and diverting that captured water to flow by gravity inwardly toward the fire. The longitudinal water catchers 44 gather water that would otherwise land on the floor, and use that water to directly fight the fire.

Figure 5:
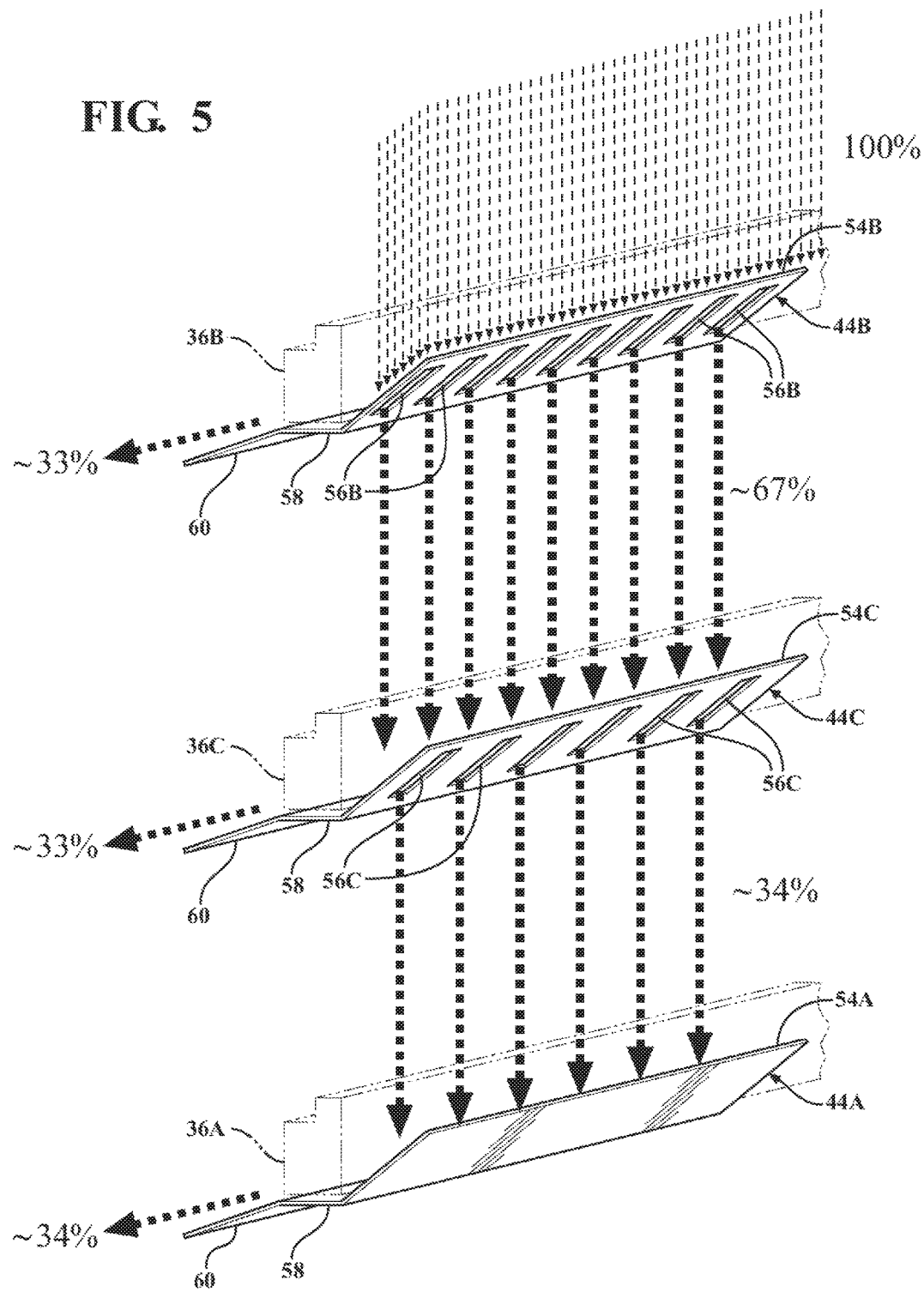
FIG. 5 shows, in highly simplified form, three water catchers in an exemplary three-shelf storage rack where the cantilevered extension flaps of the two upper water catchers are perforated to allow some water flow-through to be captured at a lower level so that water is distributed in a balanced manner across multiple levels.
Figure 6:
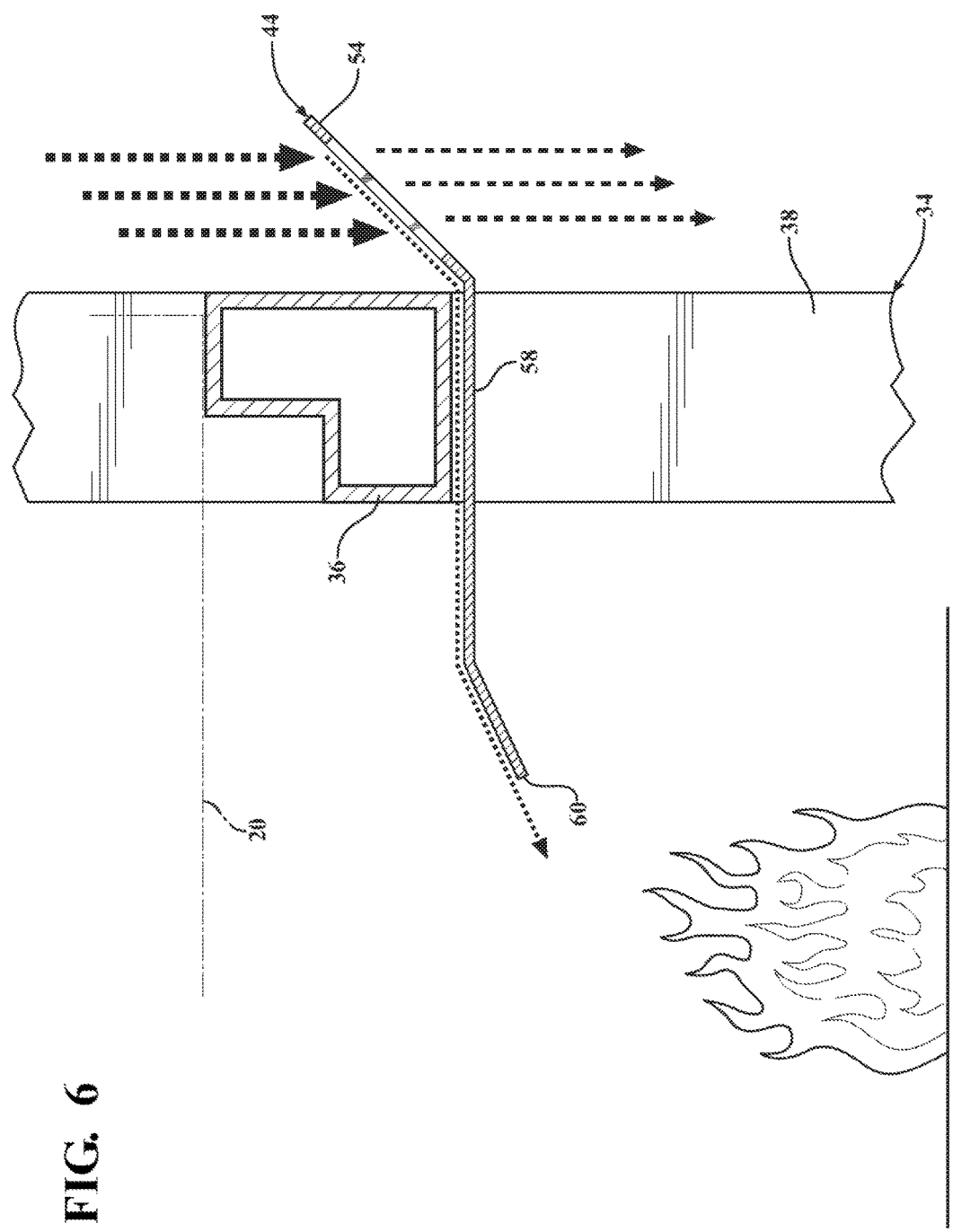
FIG. 6 is a simplified cross-section through a beam and water catcher showing the capture and diversion of falling water toward an internal fire.

The longitudinal water catchers 44 can take many different forms and designs. They can be static or dynamic. They can be capable of retrofit installation or integrally formed with the beam 36. In the example of FIGS. 5-6, each water catcher 44 is a rigid, non-articulating, sheet-like member that is attached to the rack array 24 in any convenient manner. The water catcher 44 could be screwed or bolted directly to the associated beam 36, or hooked onto the beam 36, or supported between the uprights 38. In the latter case, the longitudinal water catchers 44 can be installed using tabs that mate with the existing upright 38 hardware thereby enabling installation and removal without tools or special fasteners. Of course, many alternative mounting options are available, including direct mechanical fastening to the beams 36 and/or the uprights 38, magnets, adhesives, etc. The Figures illustratively depict each longitudinal water catcher 44 spanning the entire width of a beam 36, however they could be composed of two or more independent sections as suggested in FIGS. 17 and 18.

An extension flap 54 extends in cantilever fashion into the path of falling water like an inverted awning. Preferably, the extension flap 54 is fixed in (or moveable to) an upward incline, thus forming a trough-like appearance. The vertical height of the extension flap 54 should not protrude above the associated beam 36 so as not to interfere with articles 20 on the shelf formed by the beam 36. The horizontal displacement of the extension flap 54 is preferably as great as practically possible to maximize collections of falling water.

Although FIGS. 4-6 show the extension flap 54 as a relatively straight and planar member, some curvature and/or other shaping could be introduced to either maximize water handling or improve safety or durability or facilitate manufacturing, etc.

Optionally, the extension flap 54 may be perforated as shown in FIG. 5 to allow a portion of the collected water to pass vertically therethrough. Or alternatively, the horizontal extension of the extension flaps 54 on the lower levels may be longer to capture falling water missed by shorter extension flaps 54 above. Yet another balancing option is described below in the context of water catchers 44 designed in short lengths that are fractions (e.g., ¼ or ⅓ or ½) of the overall length of the beams 36. These and other techniques may be employed to balance the water distribution among the various shelving levels within the rack array 24.

The highly simplified example of FIG. 5 shows a three-level rack array 24. A longitudinal water catcher 44A, 44B, 44C is affixed to the beam 36A, 36B, 36C corresponding to each level. Each water catcher 44A-C has an extension flap 54A-C that protrudes horizontally the same distance out from the side of the rack array 24. In this simple hypothetical, it is assumed that all (100%) of the water falling into the uppermost extension flap 54B is to be distributed evenly among three shelving levels. One way to accomplish this balancing objective is to fit the uppermost extension flap 54B with many apertures 56B that allow approximately two-thirds (⅔) of the captured water to bypass, and flow vertically through to the lower levels. The ⅓ of the water collected at this uppermost level is diverted toward the interior of the rack array 24. The remaining ⅔ (~67%) of water falls into the intermediate extension flap 54C, which is formed with a few apertures 56C that allow approximately one-half of the water to be diverted toward the interior of the rack array 24 and the other half to bypass. The bypass water falls to the extension flap 54A at the lowermost level. The lowermost extension flap 54A does not have any apertures because it is not desirable that any water bypass the lowermost level. All of the water collected by the lowermost extension flap 54A is diverted toward the interior of the rack array 24. In this example, which is also visualized in FIG. 4, the falling water is more or less equally distributed among the several levels. In other contemplated embodiments, it may be desirable to establish unequal distributions using different sizes or numbers of apertures 56 or other techniques. For instance, it may be decided that a majority of water should be delivered to the two lowermost shelving levels, and only a small fraction of water to the uppermost levels. Many variations are of course possible.

Turning again to the cross-sectional view of FIG. 6, the water catcher 44 is shown including a sluice section 58 extending inwardly from the extension flap 54. The sluice section 58 conducts water underneath the associated beam 36. Preferably, the sluice section 58 is maintained relatively close to the bottom of the beam 36 to minimize loss of clearance needed when moving articles 20 into and out of the shelf below. A spout 60 extends inwardly from the sluice section 58. The sluice section 58 and the spout 60 are configured to route water from the extension flap 54 below an associated one of the front and rear beams 36. FIG. 6 portrays the spout 60 as a sheet-like member that projects only a relatively short distance into the rack array 24. In a different example, the spout 60 may be formed into multiple channels to produce stream-like fingers of water. These channels may have different lengths to distribute the water different distances inside the rack array 24. In another example, the spout 60 remains a sheet-like member as in FIG. 6, however its internal projection is relatively long so that water diverted from the extension flap 54 is deposited near the center of the rack array 24. These are a few of the many possible options.

Figure 7:
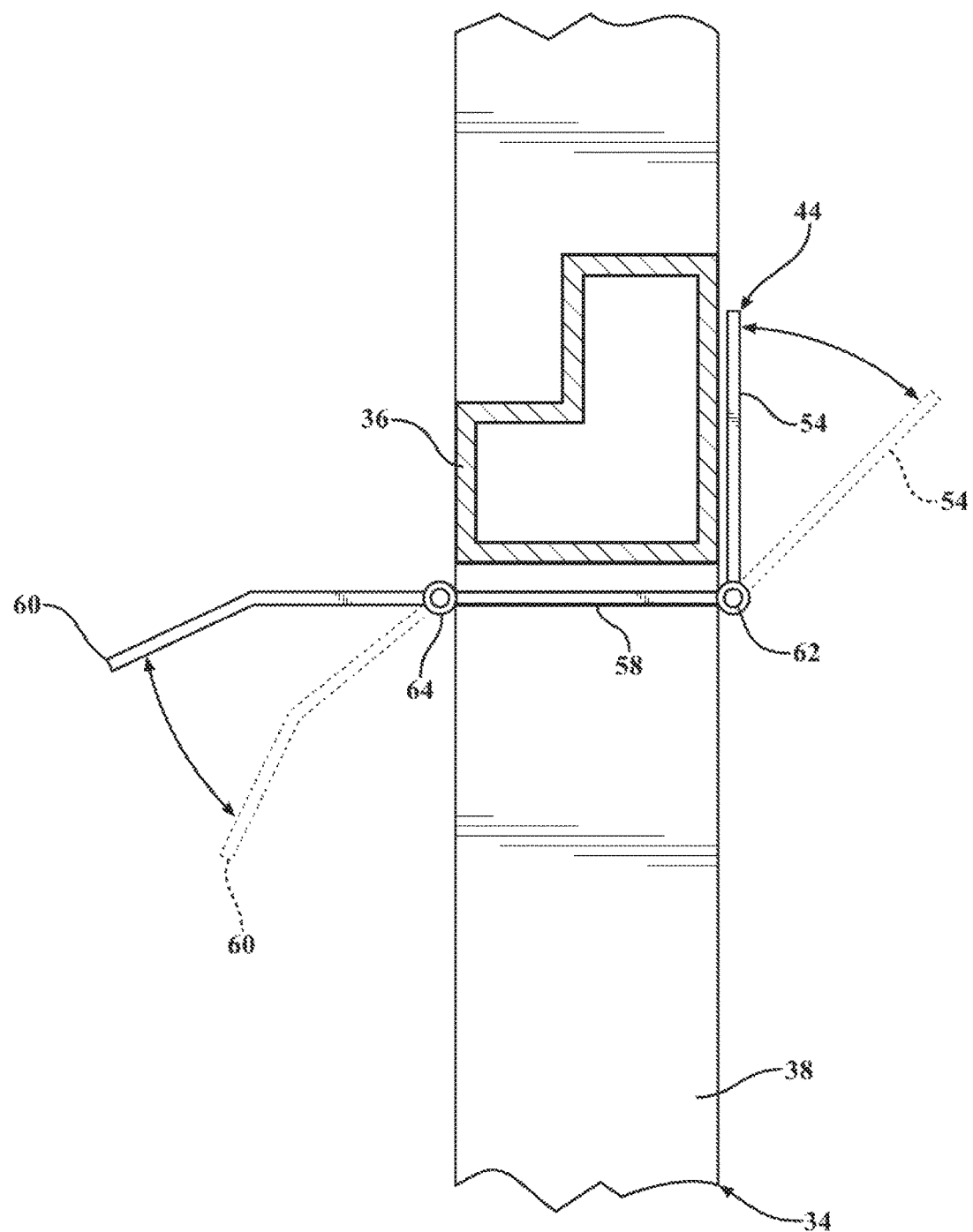
FIG. 7 is a cross-sectional view as in FIG. 6 but showing an alternative embodiment in which the cantilevered extension flap and spout are hinged to the sluice section either for impact absorption or as part of a trigger-activated system.

FIG. 7 is a view similar to FIG. 6 but shows an optional construction where the extension flap 54 and/or spout 60 are moveable relative to the sluice section 58. Specifically, a flap hinge 62 pivotally interconnects the extension flap 54 to the sluice section 58, and a spout hinge 64 pivotally interconnects the spout to the sluice section 58. The purpose of the hinges 62, 64 is to enable some give in the event of collision with a forklift or other object. That is to say, if a foreign object were to strike the extension flap 54, the flap hinge 62 would allow the extension flap 54 to deflect, thus avoiding or minimizing damage. A spring (not shown) could urge the extension flap 54 back to its normal operational position after the collision. Such a spring may be integrated into the flap hinge 62, or operatively disposed between the extension flap 54 and some other fixed member.

In another contemplated embodiment, the hinge flap 62 is omitted but instead the extension flap 54 is made from a resilient, impact-resistant, high-temperature rated polymeric material that will inherently yield to a striking force and then recover. There are many commercially available material options, one of which is an injection moldable silicone composition like that used, for example, to make some protective kitchen handling devices like pot holders. An entire longitudinal water catcher unit 44A could be molded to shape using a resiliently flexible, high-temperature composition like this.

In one envisioned scenario, the water catcher unit 44 is designed as a fractional length of the overall beam 36. For example, if the beam 36 is nine feet (9') long, the water catcher 44 may be made in three-foot (3') increments, so that three water catcher units 44 would need to be arranged end-to-end to cover the entire longitudinal length of the beam 36. As an option, magnets could be insert-molded within the high-temperature polymeric material, enabling the units 44 to be instantly attached to the beams 36. The resilient composition would enable the extension flap 54 to yield when struck with an object, and then return to its original shape. Some degree of balancing could be achieved by locating fewer water catcher units 44 at higher levels. For example, in the example just given where the beam 36 is nine feet (9') long and the water catcher 44 units are made in lengths of three feet (3'), perhaps only one water catcher 44 is attached to the uppermost beams 36B, two off-set water catchers 44 are attached to the intermediate beams 36C, and three water catchers 44 are attached to the lowermost beams 36A. These are, of course, merely some examples of the many possibilities afforded when the length of the water catcher unit 44 is designed as a fraction of the overall length of the beam 36.

Figure 13:
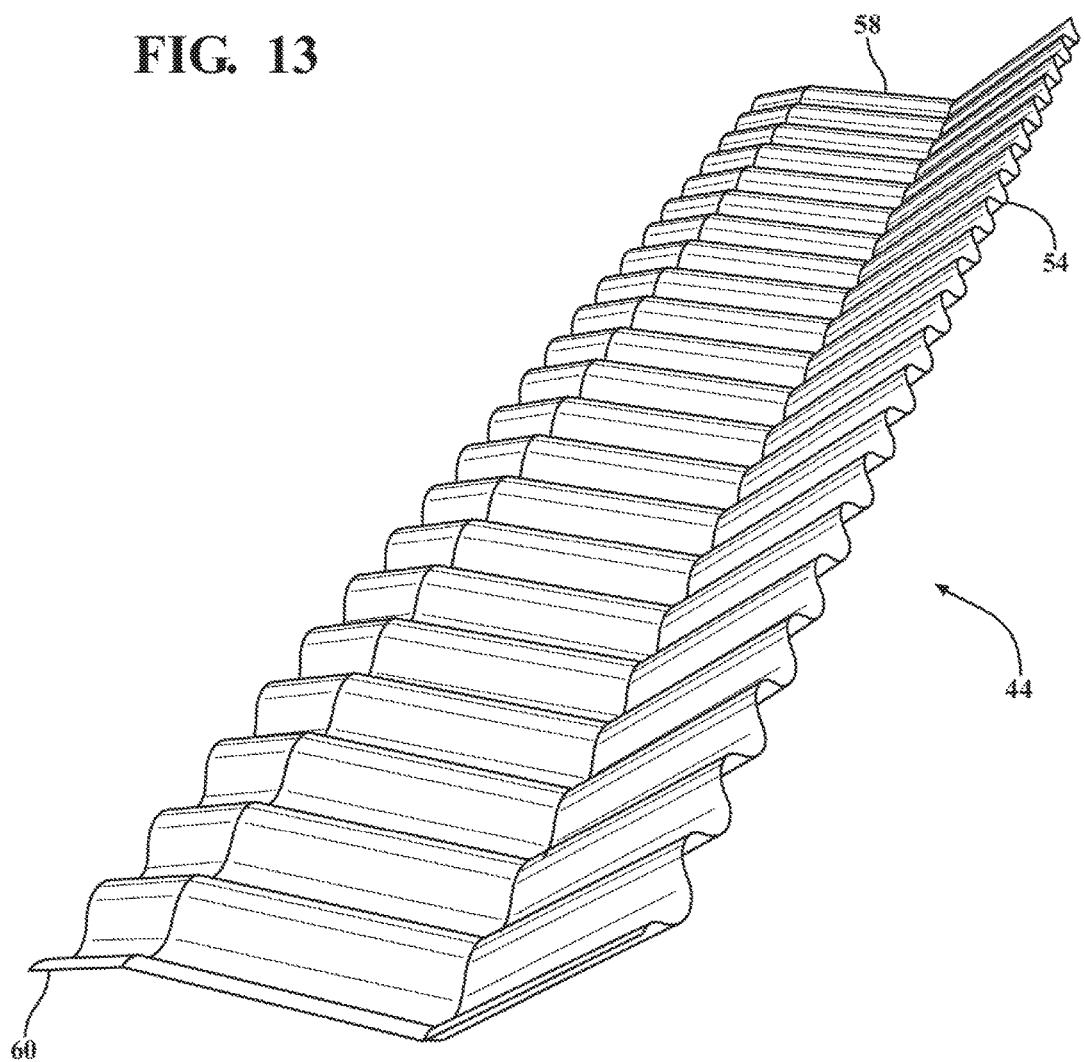
FIG. 13 shows a water catcher fabricated from a corrugated sheet material according to an alternative embodiment.

FIG. 13 shows the water catcher 44 as optionally fabricated from a corrugated sheet material. This construction, or other undulating arrangements, may provide a low-cost alternative that is easy to attach directly to the beams 36 in a retro-fit manner. The corrugated water catchers 44 could be made in short lengths, e.g., two-feet long, and ganged together with overlapping ends to accommodate any length beam 36 without cutting. The corrugated design could be fabricated from a sheet metal, or perhaps the aforementioned resilient, impact-resistant, high-temperature rated polymeric material to name but two of the many possible material choices.

In yet another variation, the hinged extension flap 54 and spout 60 can be implemented in combination with a trigger mechanism 66 that is responsive to heat and/or water. In this variation, which is illustrated in one exemplary implementation in FIGS. 14 and 15, the trigger mechanism 66 restrains the flap hinge 62 and the spout hinge 64 in a normally compacted, un-activated condition. The extension flap 54 and spout 60 are connected by respective crenelated finger hinges 62, 64 that include integrated tabs to arrest rotation of the articulated members at determined angles.

Figure 14:
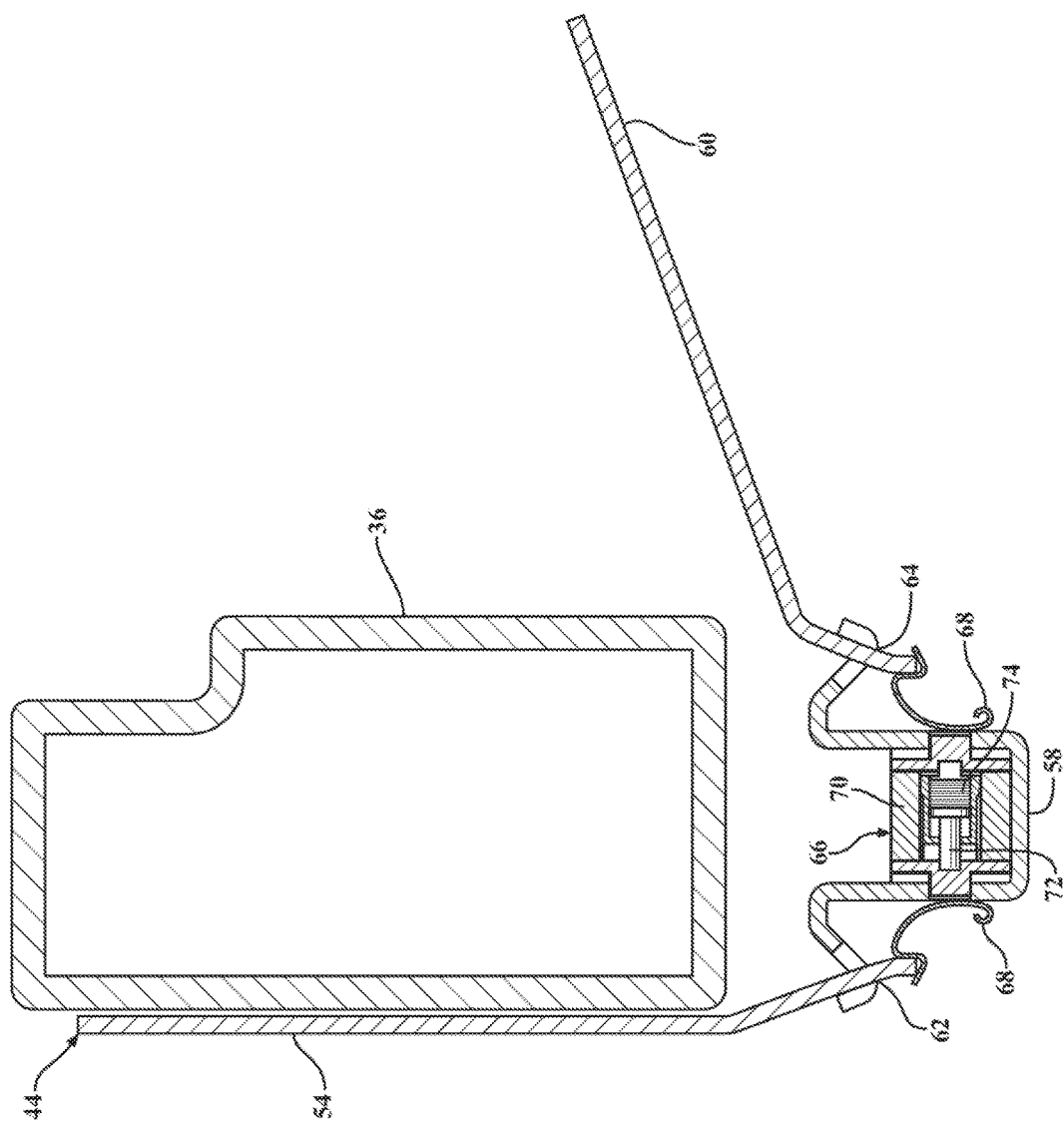
FIG. 14 is a simplified cross-section view through a beam and water catcher according to yet another alternative embodiment of the invention in which the water catcher has a hinged extension flap and spout that are maintained in a collapsed condition by a trigger sensitive to heat and/or water.
Figure 15:
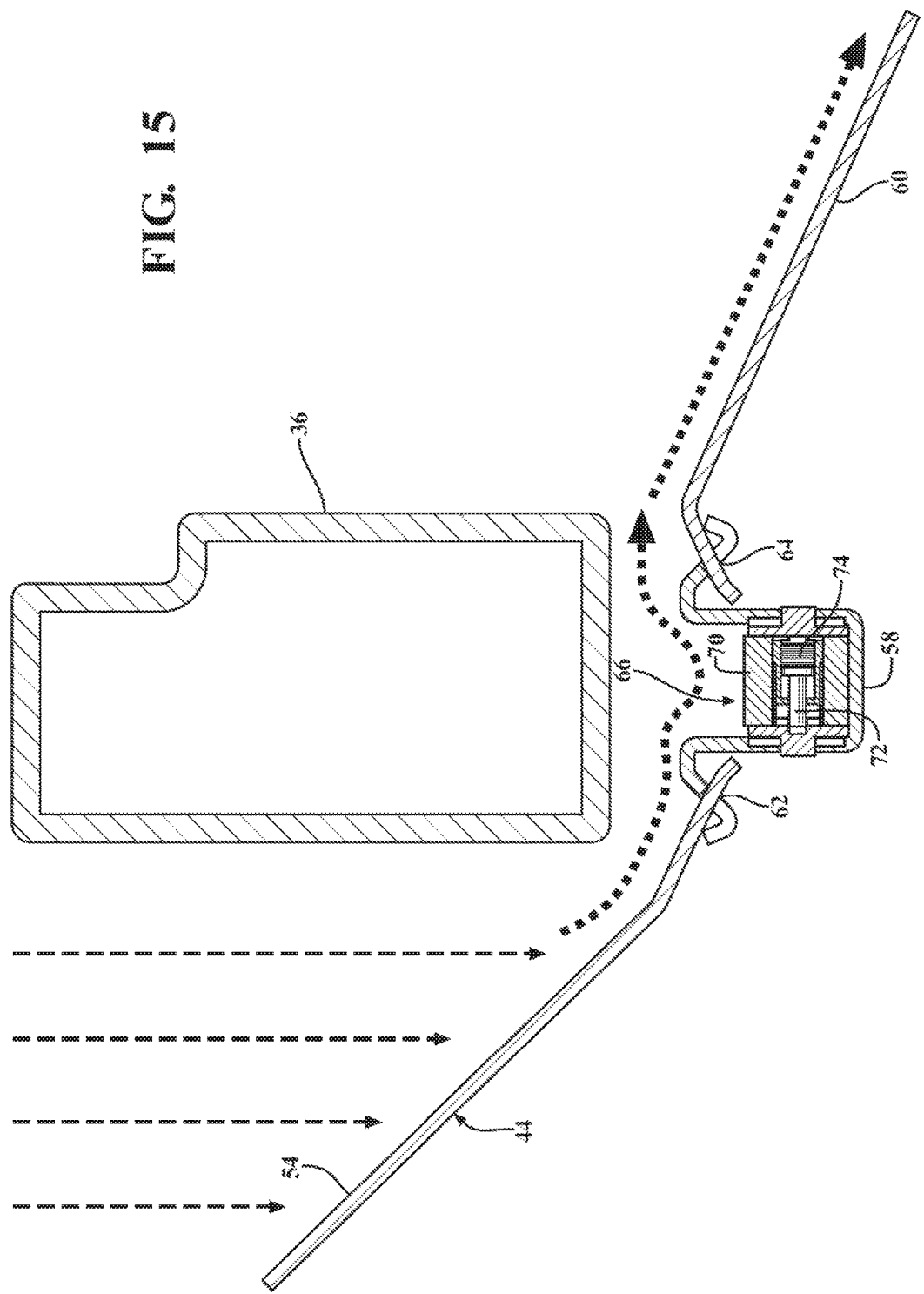
FIG. 15 is a cross-sectional view of the alternative embodiment as in FIG. 14 but showing the hinged extension flap and spout in a deployed condition capturing and diverting falling water.

The un-activated condition can be observed in FIG. 14, where the extension flap 54 is folded flat against the face of the beam 36, and the spout 60 is tucked up behind the beam 36. The snug-fitting, out-of-the-way orientation of these members 54, 60 will not interfere with the normal loading and unloading of storage articles 20 in the rack array 24. FIG. 15 shows the extension flap 54 and spout 60 deployed after a triggering event. Several possibilities exist for the triggering event, such as: the presence of water (as from the sprinklers 28); the presence of heat (as from a nearby fire); the presence of smoke (as from a nearby fire); an audible alarm (as may be triggered by a fire alarm); or any other suitable indicator. In fact, the system of this present invention can be designed with fail-safe features so as to be concurrently responsive to multiple triggering events. For example, the longitudinal water catchers 44 may be designed to deploy in response to a sensed presence of water and also to a sensed presence of smoke and also to a sensed presence of heat. When any one of these triggering events is first detected, extension flap 54 and spout 60 will simultaneously deploy.

The extension flap 54 and spout 60 are held in their normal, non-deployed positions (FIG. 14) by respective spring clips 68. Each spring clip 68 has a tiny spur that seats in a hole in the side of the sluice section 58. When the trigger 66 is activated, the spurs are pushed out of their respective holes, allowing the spring clips 68 to fall away. The extension flap 54 and spout 60 then fall into their respective deployed positions by the combined forces of gravity and falling water (from the discharging overhead sprinklers 28). Depending on the configuration of the spring clips 68, it is contemplated that upon activation the trigger 66 will cause the spring clips 68 to impart an initial torque to the extension flap 54 and spout 60 via their respective tabs. This initial torque acts as in impulse that urges the extension flap 54 and spout 60 toward their deployed conditions, which urging is then supplemented by gravity and water fall (if available). FIG. 15 is a simplified schematic illustrating the collection and redistribution of water via the longitudinal water catcher assembly 44. Springs may, of course, also be utilized to deploy the articulated members 54, 60.

The triggering device 66 can be designed to operate in any number of ways in response to any number of different triggering events. The trigger 66 example illustrated in FIGS. 14 and 15 is responsive to both water and heat. The triggering mechanism 66 here takes the form of a bobbin having a generally cylindrical shape with posts at each end that seat in holes in the sluice section 58, directly adjacent the spurs of the spring clips 68. The trigger 66 is designed to expand/lengthen in response to either water or sufficient heat. When the trigger 66 expands, its pins push outwardly through the respective holes in the sluice section 58, thus dislodging the spurs. The stored energy in the bent spring clips 68 is released, forcing them to quickly eject.

Water activation of the trigger 66 may be accomplished via a hydrophilic sleeve 70 inside the bobbin. When water from the discharging overhead sprinklers 28 contacts the trigger 66, the hydrophilic sleeve 70 rapidly expands with a hydraulic force that drives apart the two end posts. Heat activation of the trigger 66 may be accomplished via a heat sensitive annular, internal plug that surrounds a plunger 72. The head of the plunger 72 is packed against a compression spring 74. The heat-sensitive plug holds the plunger 72 against the spring 208, and is designed to yield at a specified temperature. The yield temperature is preferably higher than that of the overhead fire sprinklers 28, and may be different for each shelving layer of the storage rack. When the yield temperature of the plug is reached, the spring 74 will expand causing the plunger 72 to extend and thereby separate the end posts. It must be emphasized that a vast number of alternative designs are possible to accomplish the triggering function of this optional embodiment.

Continuing with the example of FIGS. 14 and 15, it is a general design objective that the overhead fire sprinkler system 22 first activates, and only afterward the water catchers 44 will deploy, and perhaps then only water catchers 44 that are proximate the fire will deploy (in the case of exclusively heat-sensitive triggers 66). For example, if the triggering strategy is exclusively heat activation, then a temperature well above the trigger temperature of the overhead sprinklers 28 will be used. The lowermost level of water catchers 44 may deploy in the neighborhood of 500 degrees. The next higher level of water catchers 44 may deploy in the neighborhood of 600 degrees. And the next higher level of water catchers 44 may deploy in the neighborhood of 700 degrees. Or alternatively, if the triggering strategy is exclusively water activation, the lower level may be fitted with hydrophilic sleeves 70 (or other devices) that require only a minimal amount of water to activate. The next higher level of water catchers 44 may require substantially more water to activate. And the next higher level of water catchers 44 may require even more water to activate.

Figure 8:
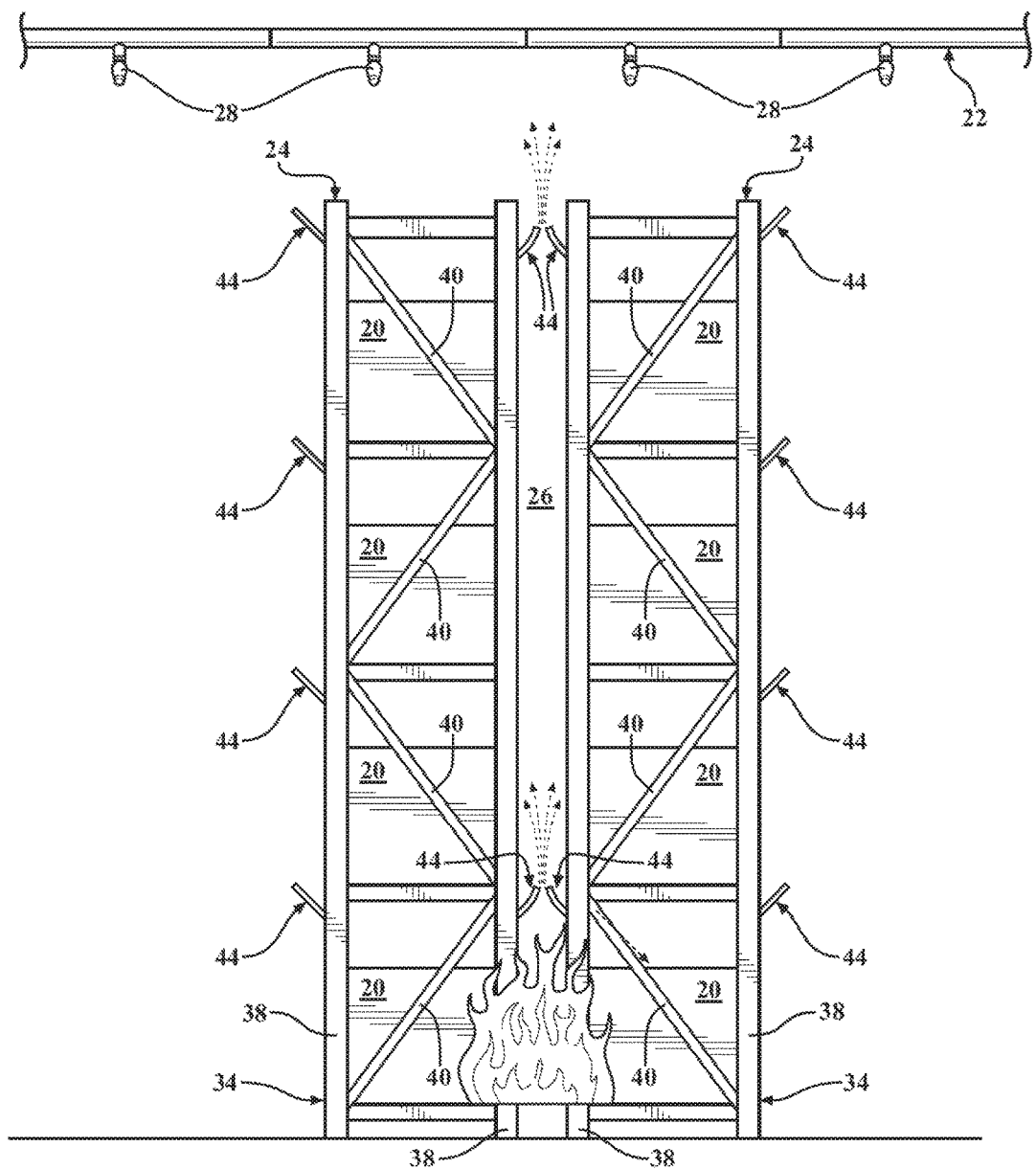
FIG. 8 is a view as in FIG. 4 but having a modified water catcher system in the longitudinal flue area that takes advantage of a vortex effect to assist movement of heat toward an overhead sprinkler system for rapid triggering purposes.

FIG. 8 is an end view of two back-to-back rack arrays 24 as in FIG. 4, but in this example the water catchers 44 located in the longitudinal flue 26 are specially shaped to generate a vortex effect that will assist movement of updrafted heat toward the overhead sprinkler system 28. In particular, water catchers 44 are only placed at the lowermost and uppermost shelving levels to mitigate drag on the upward heat flow. Upward heat flow is to be encouraged so as to rapidly trigger the overhead sprinkler system 22 in the event of a fire. The extension flaps 54 of each water catcher 44 are aerodynamically curved and arranged nearly tip-to-tip creating a nozzle-like vortex effect that accelerates heat upwardly toward the ceiling. This FIG. 8 also illustrates that water catchers 44 need not be placed on every shelving level. It is believed that at least one water catcher 44 is needed on each side of each array 24, preferably near the floor, to prevent wasteful spilling of water on the floor where it can do not good combating a fire.

Figure 9:
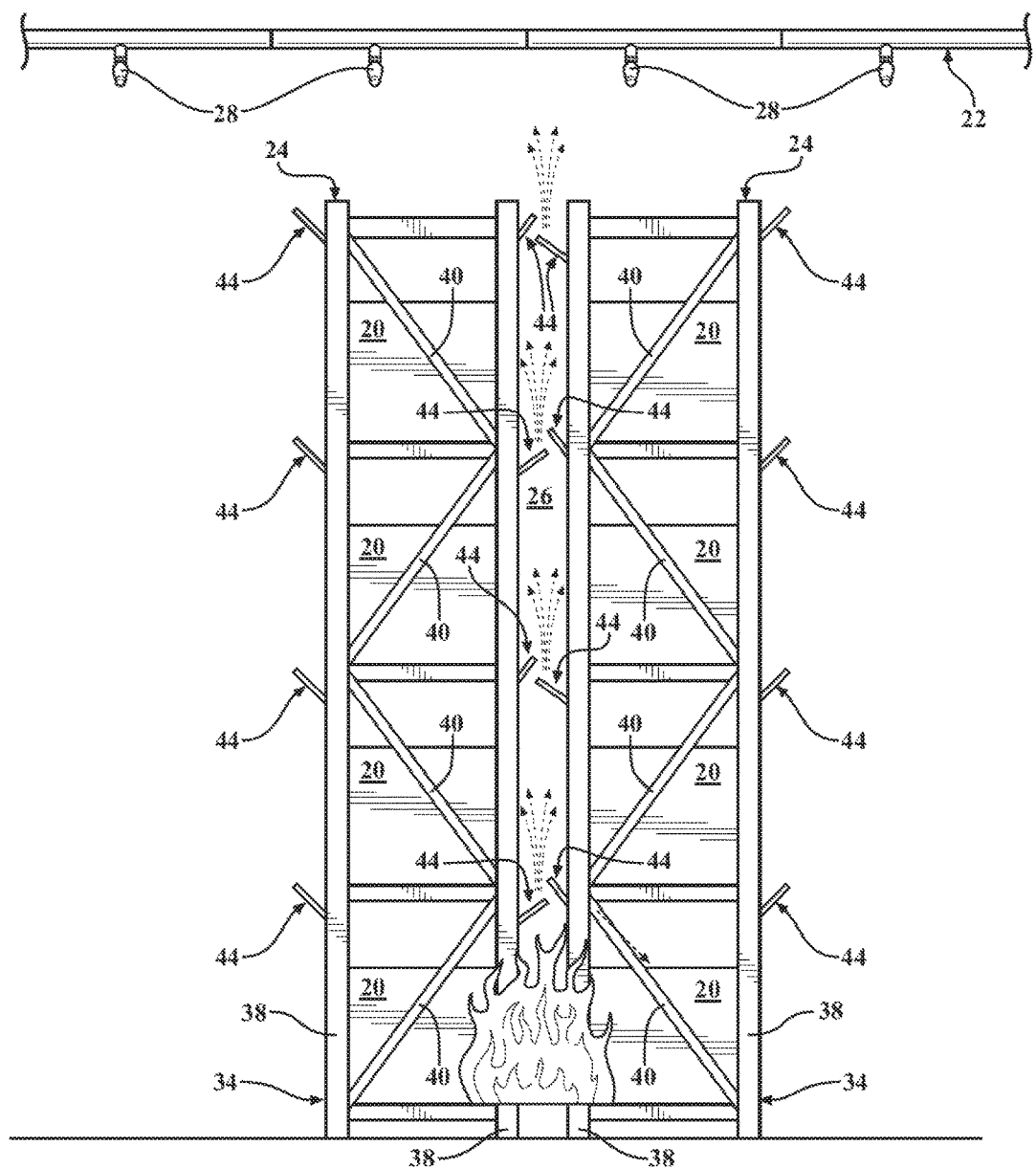
FIG. 9 is a view as in FIG. 8 but having a still further modified water catcher system in the longitudinal flue area that captures all falling water but will not impede the movement of heat toward an overhead sprinkler system for triggering purposes.

FIG. 9 is similar to FIG. 8 but depicts yet another contemplated modification to the water catchers 44 located in the longitudinal flue 26. In the arrangement shown, the water catchers 44 in the longitudinal flue 26 will capture all falling water but will not impede the movement of heat toward the overhead sprinkler system 22. Here, the extension flaps 54 in the longitudinal flue 26 are set at different angles creating convenient gaps for rising heat to pass with very little restriction. At least the tips of the lowermost extension flaps 54A in the longitudinal flue 26 extend fully to the mid-point of the longitudinal flue 26, thus allowing no possibility for falling water inside the longitudinal flue 26 to reach the floor.

This FIG. 9 also illustrates that the horizontal projections of the front side (outside) water catchers 44 could be different lengths to accomplish balancing objectives. For example, it may be desirable to divert the maximum possible about of water to the uppermost level of shelving. In this case, the extension flaps 56B of the uppermost water catchers 44B might be considerably longer to protrude outwardly the greatest extent. This is merely an example to provoke contemplation of the many possible configurations to accomplish intentional water distribution among the levels of the rack array 24. FIG. 19 portrays an alternative embodiment with adjustable extension flap 154 and spout 160 features which may be used to fine-tune balancing in the field according to the particular circumstances.

Figure 10:
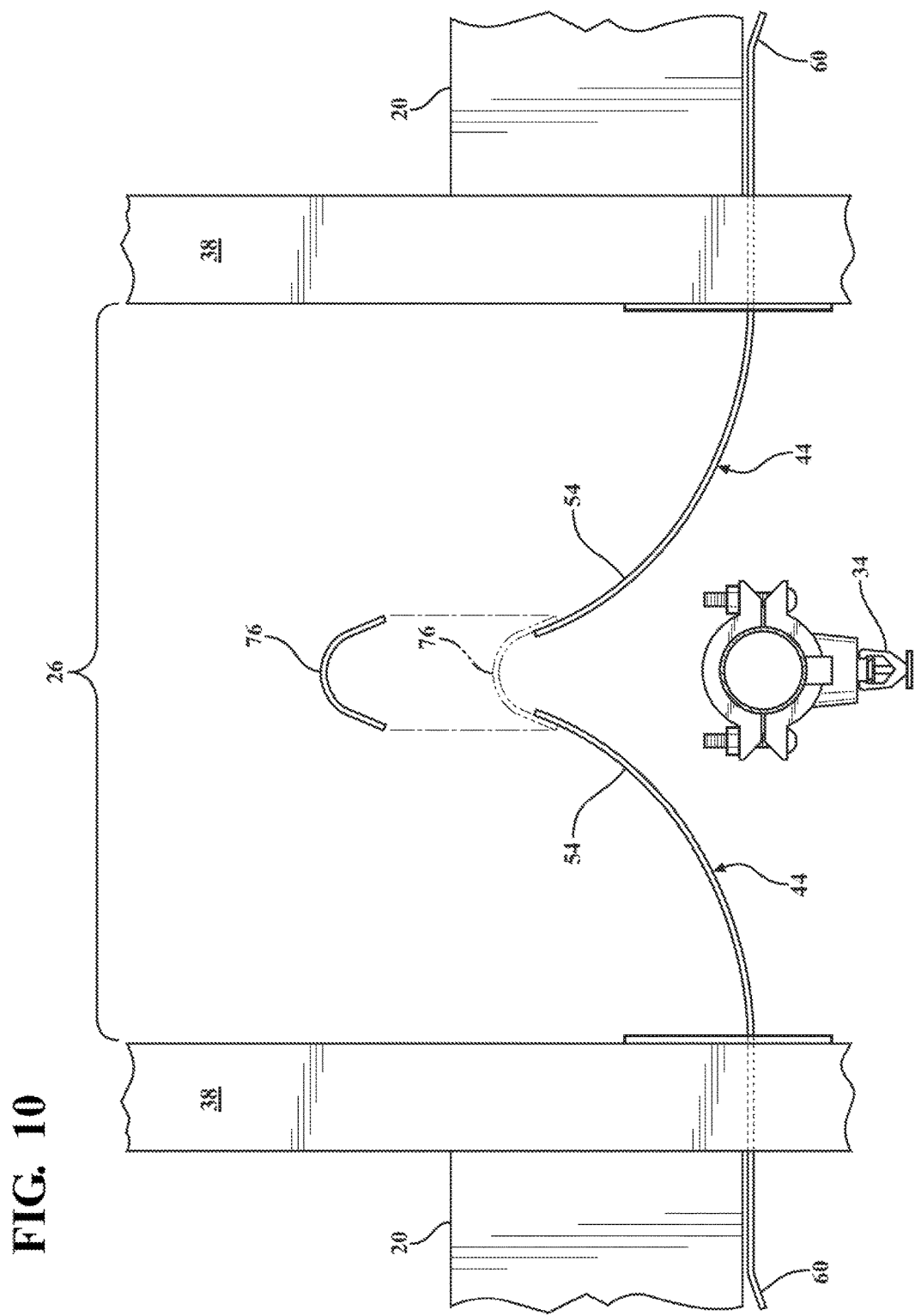
FIG. 10 is a cross-sectional view through the longitudinal flue area showing an alternative embodiment in which an in-rack sprinkler head is located directly below two opposing water catchers, and in which a ridge cap is fitted to shelter the sprinkler head from undesirable cold soldering effects.
Figure 11:
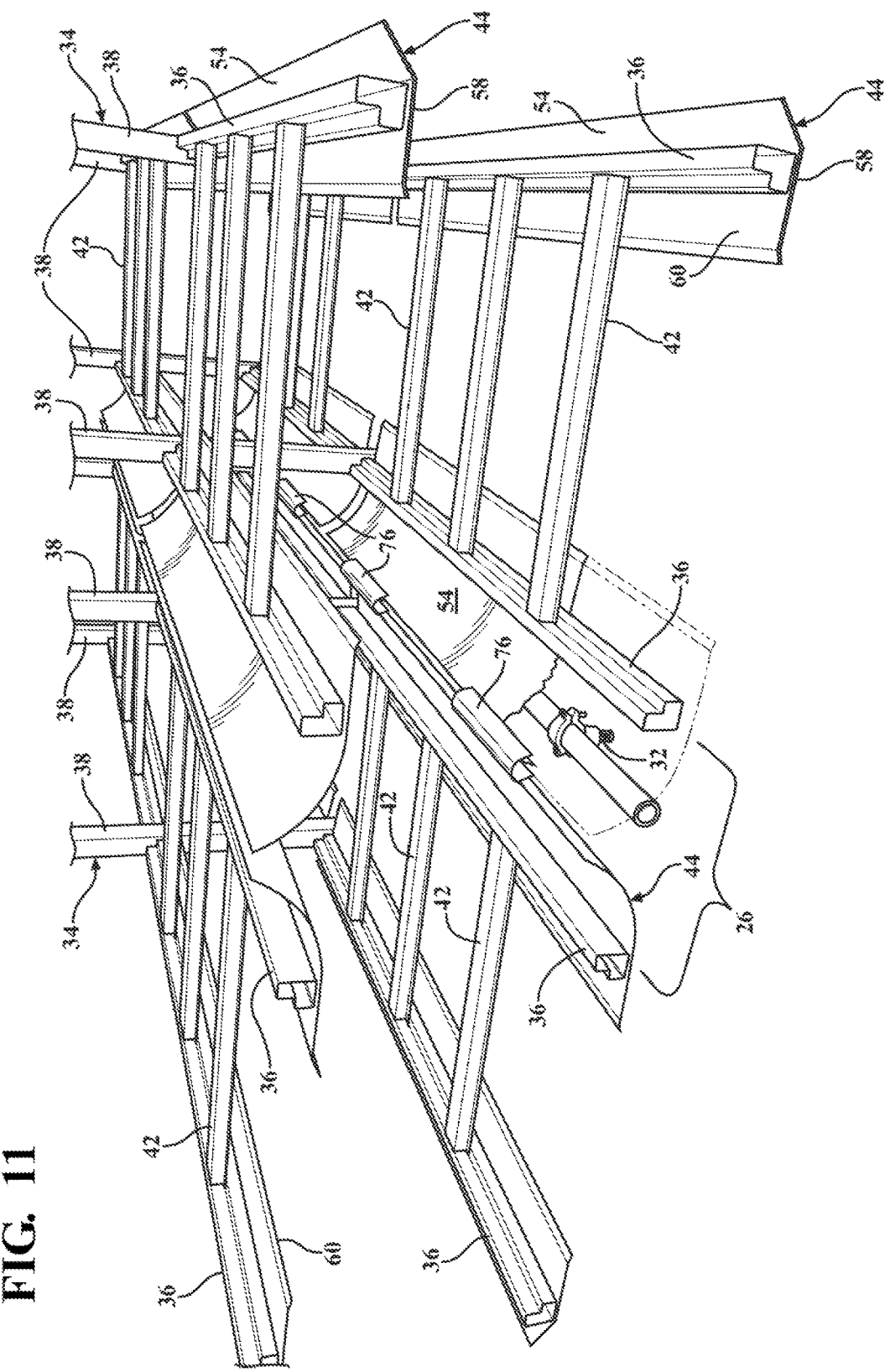
FIG. 11 is fragmentary perspective view illustrating the alternative embodiment if FIG. 10 showing and in-rack sprinkler head located below two opposing water catchers with a ridge cap thereover.
Figure 12:
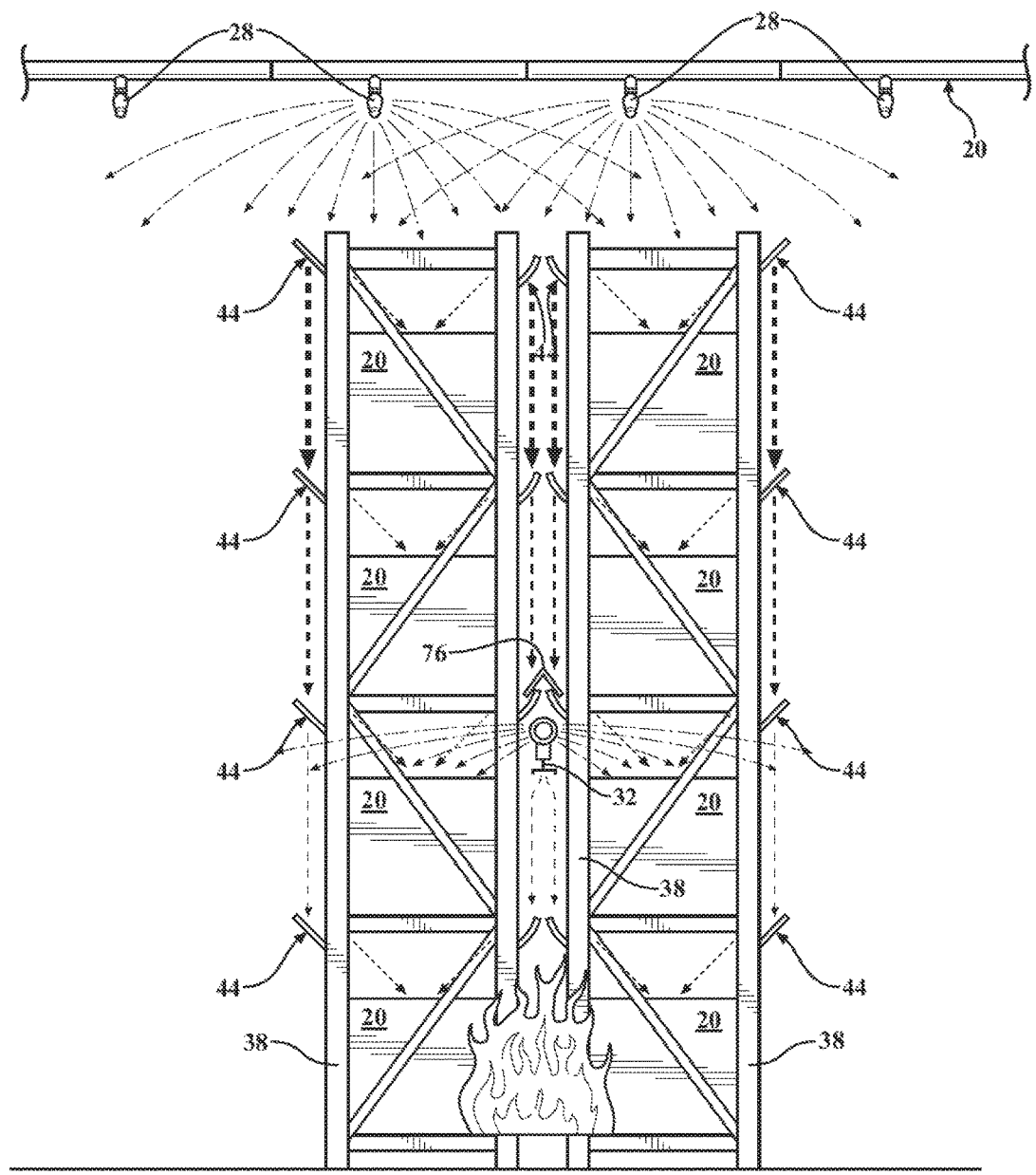
FIG. 12 is a view similar to FIG. 4 but showing against the alternative embodiment FIG. 10 where an in-rack sprinkler head is located in the longitudinal flue.

Turning now to FIGS. 10-12, an alternative embodiment is offered in which an in-rack sprinkler head 32 is located directly below two opposing water catchers 44 within the longitudinal flue 26. As suggested in FIG. 12, an in-rack sprinkler 32 may be located approximately mid-height in the longitudinal flue 26. As such, it is generally assumed that the standard overhead sprinkler system 22 will accommodate the upper regions of the rack arrays 24 while the in-rack heads 32 accommodates the lower regions. In such arrangements, it is important to protect the in-rack heads 32 from cold-soldering. That is, water from the overhead system 22 splashes onto the un-activated trigger element of an in-rack head 32, the in-rack head 32 will not activate on time allowing the fire to grow.

To address this concern, a ridge cap 76 may be fitted to the opposing extension flaps 54. The combined ridge cap 76 and extension flaps 54 will then shelter the sprinkler head 32 from the undesirable cold soldering effects. The ridge cap 76 is preferably short in length so that it does not unduly impede upward flow of heat through the longitudinal flue 26 from reaching the overhead sprinkler heads 28. That is, the ridge caps 76 will only be placed directly over in-rack sprinkler heads 32, and each ridge cap 76 will be spaced apart a considerable distance from the next ridge cap 76 to allow upward heat migration. These same ridge caps 76 will also, on a localized basis, trap heat around the in-rack sprinkler heads 32, thus helping them to activate quickly.

Figure 16:
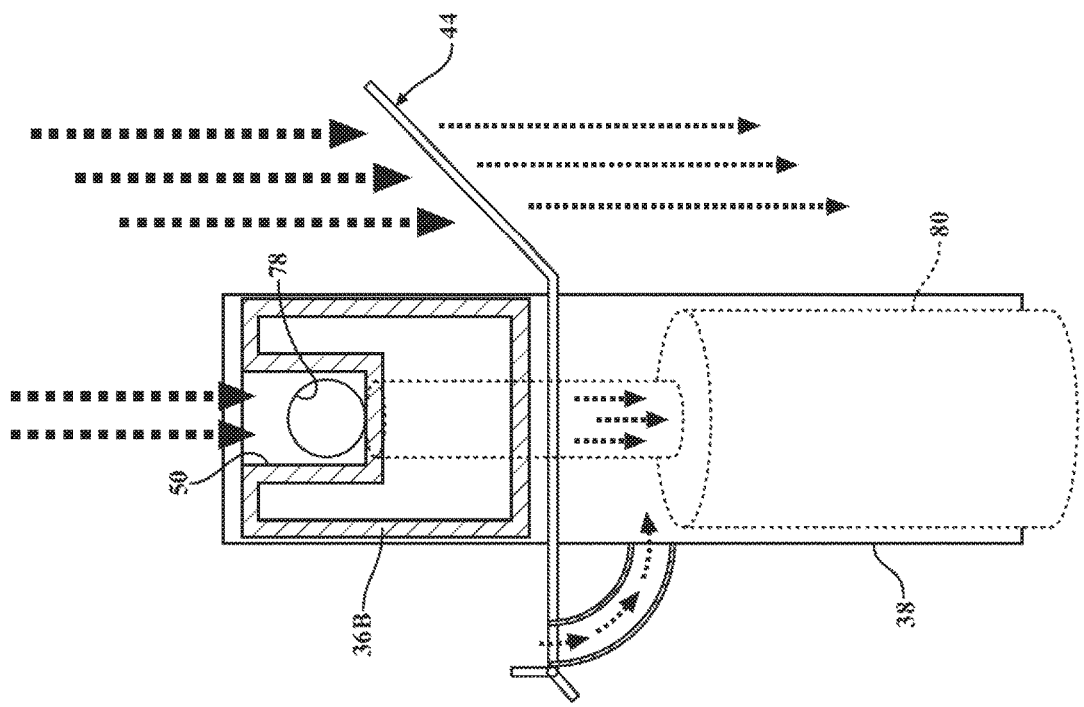
FIG. 16 is a simplified cross-section view through the uppermost beam of still another alternative embodiment, wherein the uppermost beam is formed with an integral gutter that drains into a hollow upright for express passage to a lower level of the rack system.

FIG. 16 illustrates the gutter 50 feature of the falling water collection system. The gutter 50 is optionally formed in either one or both of the front and rear beams 36B of the uppermost beam pair. At least one drain 78 is in fluid communication with the gutter 50. The drain 78 opens directly into the hollow interior passage in one of the front and rear uprights 38. Optionally, a liner 80 may be placed inside the hollow upright 38 to facilitate water conduction. A substantial quantity of water discharged from the overhead fire sprinklers 28 is expected to land on top of the storage articles 20 resting on the uppermost shelf. This water sheds around the sides of the storage articles 20, and then falls downward. The integrated gutter 50 is specially designed with a trough-like feature to collect and channel run-off water into the adjacent uprights 38. Water thus descending through the uprights 38 will provide at least two advantages. One, the water will help cool the vertical structural members 38 in the event of a fire, preserving their structural integrity at elevated temperatures. Two, the water will enter the transverse flues 30, where it will be diverted downstream by one or more deployed intra-stanchion diverters 46 in the manner described below.

If it is found that too much water is traveling down the uprights 38 and hitting the floor without being diverted toward the fire, small flaps (not shown) can be stationed inside the uprights 38 at strategic levels to coordinate with the intra-stanchion diverters 46. These small flaps could be perforated as described above to allow some water to pass through. The small flaps could either be statically located in a fixed position, or mechanized to deploy in concert with an adjacent intra-stanchion catcher 60. Optionally, water collected by the uppermost water catchers 44B could be routed into the interior of the upright 38 and merge with water from the gutter 50. This, for example, may be an attractive strategy if it is determined that expressing water flow to lower levels will be beneficial.

Turning now to FIGS. 17-18, the falling water collection system is shown in the context of a one-row rack array 24. From this view, the intra-stanchion water diverters 46 can be seen operatively extending between the front and rear uprights 38 of each stanchion section 34. These intra-stanchion water diverters 46 collect sprinkler water passing vertically through the stanchion sections 34 and divert at least a portion of the collected water interiorly, toward the other of the stanchion section 34. The purpose of the intra-stanchion diverters 46 is to divert water that falls down the transverse flue 30 that is formed between two uprights 38 (as opposed to the transverse flues 30 formed mid-span as gaps between storage articles 20). The intra-stanchion diverters 46 have a main gate 82 and optional extension plate 84. The intra-stanchion diverters 46 can, like the longitudinal water catchers 44, be made static or dynamic. In the dynamic example, the main gate 82 and/or the extension plate 84 are pivotally supported for movement between non-deployed and deployed conditions. Naturally, many design options are possible.

In the non-deployed condition, the main gate 82 is in a generally vertical orientation and does not impede the movement of heat upwardly through the transverse flue 26 nor the downward movement of water therethrough. It is generally considered important that the upward movement of heat not be impeded by the intra-stanchion diverters 46 so that activation of the overhead fire sprinkler system 22 will not be delayed in case of a fire. The intra-stanchion diverters 46 can either be mechanically keyed to the adjacent longitudinal water catchers 44, or be fitted with their own triggering mechanism so as to deploy only after the overhead sprinklers 22 have been activated.

Once deployed, the main gate 82 will tip into the transverse flue 30 to divert all or a portion of the water falling down the transverse flue 30 toward the middle of a shelf where there may be a fire. The main gate 82 could, if desired, be perforated to allow some portion of water to pass through to lower levels. In the event intra-stanchion diverters 46 deploy at multiple levels, perforated main gates 84 will allow some water to continue to reach down to the lower levels. The apertures (or other flow diversion shapes) could be incorporated to balance flow of falling water through the transverse flues 30. It is also contemplated that the main gates 84 could be statically fixed in the transverse flues 30, provided their arrangement and/or construction did not unduly impede the flow of heat up the transverse flue 30 nor the ability for some portion of water to pass through to lower levels.

The falling water collection system may, optionally, also include one or more mid-span water diverters 48 operatively extending between the front and rear beams 36 of a beam pair for diverting at least a portion of the falling water onto adjacent articles 20. The mid-span diverters 48 can be attached to the inside faces of the beams 36, or supported between two opposing longitudinal water catchers 44, such as by their respective spouts 60. Typically, the mid-span diverters 48 will be located mid-way along the length of a shelf, in the transverse flues 30 formed mid-span as gaps between storage articles 20. When space permits, the specific mounting location of the mid-span diverters 48 would be adjustable to accommodate situations where the transverse flues 30 formed mid-span are not centered between the stanchion sections 34. The mid-span diverters 48 can take a wide variety of shapes and designs. In the illustrated examples, the mid-span diverters 48 are butterfly-like as formed by a pair of hinged wings that can either be statically held in their spread condition or dynamically trigger from a normally folded slim vertical orientation. The inverted V-shape sheds water in two opposite downward vectors. Also, the mid-span diverters 48 could, if desired, be perforated to allow some portion of water to pass through to lower levels. Many variations are of course possible.

The falling water collection system may, optionally, also include one or more vertical flue catchers 52 operatively associated with at least one of the front uprights 38. The vertical flue catchers 52 include a pair of outwardly fanned vanes 86. Water sprayed by the overhead fire suppression system 22 may have a significant lateral trajectory. In particular, some spray heads are being developed that accentuate the lateral spray trajectory. See for example U.S. Patent No. 2015/0265865 published Sep. 24, 2015 and U.S. Pat. No. 9,381,386 issued Jul. 5, 2016, the entire disclosures of which are hereby incorporated by reference and relied upon. When used in conjunction with storage rack system of this present invention, substantially improved fire suppression performance may be possible. The vanes 86 are configured to route laterally sprayed water into the stanchion section 34 thus forcing water into the transverse flues 30 to be efficiently diverted toward the fire by an underlying intra-stanchion diverter 46. When nearby sprinkler heads 28 are activated, their spray could hit the vertical faces of storage articles 20 located on the uppermost shelves of the rack arrays 24. The function of the vertical flue catchers 52 is to help direct, or funnel, more of this water spray into the transverse flues 30. The vertical flue catchers 52 are preferably located only on the front uprights 38 exposed to an aisle way (i.e., not inside the longitudinal flue 26), in the space between the one or two rows below the uppermost shelves in the rack array 24.

Like other elements of the falling water collection system, the vertical flue catchers 52 can also be made static or dynamic. In the dynamic example, the vertical flue catchers 52 would be normally folded in a non-deployed condition, and when activated spring into a deployed condition. In this illustrated embodiment, the vertical flue catchers 52 each comprise a flap-like door that is pivotally supported to open like flower pedals when activated. Although the illustrations only show the vertical flue catchers 52 installed on the uprights 38, they could also or alternatively be installed between pallets 46 mid-span along the beams 36 so that water is funneled into all of the transverse flues 30. Furthermore, it is contemplated that the vertical flue catchers 52 could be positioned above the top storage shelf. Along these lines generally, it is also contemplated that one or more horizontal splash diverters may be added above the top of the storage—preferably centered in the horizontal flue—to catch the spray and push it into the flues 30. These and other flap-like constructions may be employed to better manage the movement of water through a rack array 24 so that fires can be more efficiently combatted.

In FIG. 19, an alternative embodiment of the water catcher 44 is shown having an adjustable extension flap 154 and an adjustable spout 160. In this highly-simplified view, the extension flap 154 and spout 160 are secured with lateral sliding capabilities, such as by two or more short bolts or threaded posts carried in respective slot. Wing nuts 188 threaded onto these bolts allow the respective extension flap 154 and spout 160 to be secured in a particular length-adjusted position. The lateral adjustment features enable the water catcher 44 to be fine-tune in the field in response to existing circumstances. For example, in this view an especially deep article 20 is supported on the beam 36. The outer end of the article 20 overhangs the beam 38. In such circumstances, or in circumstances where additional water collection is desired, the adjustable extension flap 154 is expanded to the position outlined in phantom, and then secured in place with the associated wing nuts 188. If the situation would benefit from the spout 160 being extended further toward the center of the underlying article, its position can be extended in a similar manner and locked in position with the wing nut 188. Naturally, many alternate slider mechanisms and/or locking schemes are possible.

Although the descriptions given herein are primarily in relation to the structural features and arrangements, it will be understood that the invention also embraces a method for combating fires in a water collecting warehouse storage rack by collecting water falling on or about the outside of a rack array, as well as water falling through the various flues, and channeling the collected water inwardly into the shelving to wet articles supported therein. Thus, all functionality and all uses ascribed to the various components and combinations above shall be understood also within the context of novel methods for accomplishing fire suppression by exploiting sprayed water that might otherwise land on the floor to no real benefit.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. An open framework warehouse storage rack of the type for supporting articles on multi-tiered shelves within the wetting zone of an overhead fire sprinkler system, said storage rack comprising:
    a longitudinally extending rack array having a front side and a rear side, said rack array having at least two longitudinally spaced-apart stanchion sections, each said stanchion section being perpendicularly offset from the next adjacent stanchion section, a plurality of horizontal beams interconnecting adjacent stanchion sections, said plurality of beams being disposed at different elevations to form multi-tiered article support shelves,
    wherein the space between said front side and said rear side comprises an interior region, and
    a falling water collection system, said falling water collection system including at least one water catcher operatively protruding outwardly from said interior region beyond one of said front and rear sides for collecting water falling outside of said rack array and channeling the collected water into said interior region to enhance the wetting of articles supported therein during a fire.

2. The storage rack of claim 1, wherein said water catcher includes an extension flap extending in cantilever fashion, said extension flap having an upward incline.

3. The storage rack of claim 2, wherein said extension flap is perforated to allow a fractional portion of the collected water to pass vertically therethrough.

4. The storage rack of claim 3, wherein said water catcher includes a sluice section extending from said extension flap toward said interior region.

5. The storage rack of claim 4, wherein said water catcher includes a flap hinge pivotally interconnecting said extension flap to said sluice section.

6. The storage rack of claim 4, wherein said water catcher includes a spout extending from said sluice section into said interior region, said sluice section and said spout configured to route water from said extension flap into said interior region.

7. The storage rack of claim 6, wherein said water catcher includes a spout hinge pivotally interconnecting said spout to said sluice section.

8. The storage rack of claim 7, wherein said water catcher includes a flap hinge pivotally interconnecting said extension flap to said sluice section, said water catcher including a trigger mechanism responsive to at least one of heat and water.

9. The storage rack of claim 1, wherein said water catcher is fabricated from a corrugated sheet material.

10. The storage rack of claim 1, wherein each said stanchion section comprises an open framework having a vertically oriented front upright and a vertically oriented rear upright, said plurality of horizontal beams being arranged in pairs comprised of a front beam and a horizontally-aligned rear beam, each said front beam extending between and directly connecting two adjacent said front uprights, each said rear beam extending between and directly connecting two adjacent said rear uprights, and said falling water collection system further including at least one intra-stanchion water diverter operatively extending between said front and rear uprights of one said stanchion section for diverting sprinkler water passing vertically through said stanchion section toward the other of stanchion section.

11. The storage rack of claim 1, wherein said plurality of horizontal beams are arranged in pairs comprised of a front beam and a horizontally-aligned rear beam, said falling water collection system includes at least one mid-span water diverter operatively extending between said front and rear beams of one of said beam pairs for diverting at least a portion of the falling water toward said stanchion sections.

12. The storage rack of claim 1, wherein said plurality of beams includes a lowermost beam and an uppermost beam and at least one intermediate beam, said falling water collection system further including a gutter formed in said uppermost beam, at least one drain in fluid communication with said gutter.

13. The storage rack of claim 1, wherein each said stanchion section comprises an open framework having a vertically oriented front upright and a vertically oriented rear upright, said plurality of horizontal beams being arranged in pairs comprised of a front beam and a horizontally-aligned rear beam, each said front beam extending between and directly connecting two adjacent said front uprights, each said rear beam extending between and directly connecting two adjacent said rear uprights, further including a vertical flue catcher operatively associated with at least one of said front uprights, said vertical flue catcher including a pair of outwardly fanned vanes, said vanes configured to route laterally sprayed water into said stanchion section of said at least one front upright.

14. An open framework warehouse storage rack system for supporting articles on multi-tiered shelves within the wetting zone of an overhead fire sprinkler system, said storage rack system comprising:

a longitudinally extending first rack array having a front side and a rear side, a longitudinally extending second rack array having a front side and a rear side, said rear side of said second rack array disposed in parallel back-to-back relationship with said rear side of said first rack array, each said first and second rack array having at least two longitudinally spaced-apart stanchion sections, each said stanchion section being perpendicularly offset from the next adjacent stanchion section, a plurality of horizontal beams interconnecting adjacent stanchion sections, said plurality of beams being disposed at different elevations to form a plurality of horizontal shelves, wherein the space between said front side and said rear side comprises an interior region, and a falling water collection system, said falling water collection system including at least one water catcher operatively protruding outwardly from said interior region beyond at least one of said front and rear sides of each of said first and second rack arrays for collecting water falling outside of said interior region and channeling the collected water into said interior region to enhance the wetting of articles supported therein during a fire.

15. The system of claim 14, wherein said water catcher includes an extension flap extending in cantilever fashion, said extension flap having an upward incline, said water catcher including a sluice section extending from said extension flap toward said interior region, said water catcher including a spout extending from said sluice section into said interior region, said sluice section and said spout configured to route water from said extension flap.

16. The system of claim 15, wherein said extension flap is perforated to allow a portion of the collected water to pass vertically therethrough.

17. The system of claim 15, wherein said water catcher includes a flap hinge pivotally interconnecting said extension flap to said sluice section, a spout hinge pivotally interconnecting said spout to said sluice section, and a trigger mechanism responsive to at least one of heat and water.

18. The system of claim 14, wherein a longitudinal flue space is formed between said rear side of said second rack array and said rear side of said first rack array, further including at least one ridge cap disposed on at least one said extension flap within said longitudinal flue space, said ridge cap being configured to shelter an underlying in-rack sprinkler head from water falling in said longitudinal flue.

19. The system of claim 14, wherein each said stanchion section comprises an open framework having a vertically oriented front upright and a vertically oriented rear upright, said plurality of horizontal beams being arranged in pairs comprised of a front beam and a horizontally-aligned rear beam, each said front beam extending between and directly connecting two adjacent said front uprights, each said rear beam extending between and directly connecting two adjacent said rear uprights, said falling water collection system further including at least one intra-stanchion water diverter operatively extending between said front and rear uprights of each said stanchion section for collecting sprinkler water passing vertically through said stanchion section and diverting at least a portion of the collected water toward the other of said stanchion sections.

20. An open framework warehouse storage rack of the type for supporting articles on multi-tiered shelves within the wetting zone of an overhead fire sprinkler system, said storage rack comprising:

a longitudinally extending rack array having a front loading side and a rear side, said rack array having at least two longitudinally spaced-apart stanchion sections, each said stanchion section comprising an open framework having a vertically oriented front upright and a vertically oriented rear upright spaced-apart by a network of cross-braces, each said stanchion section being perpendicularly offset from the next adjacent stanchion section so that the respective said front uprights are located along said front side of said first rack array and said rear uprights are located along said rear side of said first rack array, a plurality of horizontal beam pairs interconnecting adjacent stanchion sections, each said beam pair comprising a front beam and a horizontally-aligned rear beam, each said front beam extending between and directly connecting two adjacent said front uprights, each said rear beam extending between and directly connecting two adjacent said rear uprights, said plurality of beam pairs interconnecting adjacent stanchion sections and being disposed at a different elevations to form a plurality of horizontal shelves, wherein the space between said front loading side and said rear side comprises an interior region, a falling water collection system, said falling water collection system including at least one water catcher operatively protruding outwardly from said interior region beyond one of said front loading and rear sides for collecting water falling outside of said rack array and channeling the collected water into said interior region to enhance the wetting of articles supported therein during a fire, said water catcher including an extension flap extending in cantilever fashion, said extension flap having an upward incline, said water catcher including a sluice section extending from said extension flap toward said interior region, said water catcher including a spout extending from said sluice section into said interior region, said sluice section and said spout configured to route water from said extension flap, and said falling water collection system further including at least one intra-stanchion water diverter operatively extending between said front and rear uprights of each said stanchion section for collecting sprinkler water passing vertically through said stanchion section and diverting at least a portion of the collected water toward the other of said stanchion sections.

* * * * *